(12) United States Patent
Saunders

(10) Patent No.: US 8,266,056 B2
(45) Date of Patent: *Sep. 11, 2012

(54) SYSTEM AND METHOD FOR MANUFACTURING A PUNCH-OUT RFID TRANSACTION DEVICE

(75) Inventor: Peter D. Saunders, Salt Lake City, UT (US)

(73) Assignee: American Express Travel Related Services Company, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/891,729

(22) Filed: Sep. 27, 2010

(65) Prior Publication Data

US 2011/0036221 A1   Feb. 17, 2011

Related U.S. Application Data

(63) Continuation of application No. 10/746,781, filed on Dec. 24, 2003, now Pat. No. 7,827,106, which is a continuation-in-part of application No. 10/611,563, filed on Jun. 30, 2003, now Pat. No. 7,306,158, which is a continuation-in-part of application No. 10/192,488, filed on Jul. 9, 2002, now Pat. No. 7,239,226, said application No. 10/746,781 is a continuation-in-part of application No. 10/062,106, filed on Jan. 31, 2002, now Pat. No. 6,749,123, and a continuation-in-part of application No. 10/092,681, filed on Mar. 7, 2002, now Pat. No. 6,764,014, and a continuation-in-part of application No. 10/288,945, filed on Nov. 6, 2002, now abandoned, and a continuation-in-part of application No. 10/302,658, filed on Nov. 22, 2002, and a continuation-in-part of application No. 10/394,914, filed on Mar. 21, 2003, now Pat. No. 7,377,443, said application No. 10/746,781 is a continuation-in-part of application No. 10/340,352, filed on Jan. 10, 2003, now Pat. No. 7,889,052.

(60) Provisional application No. 60/427,977, filed on Nov. 20, 2002, provisional application No. 60/304,216, filed on Jul. 10, 2001, provisional application No. 60/396,577, filed on Jul. 16, 2002.

(51) Int. Cl.
*G06Q 30/00* (2006.01)

(52) U.S. Cl. ............ 705/41; 705/16; 705/17; 705/35; 705/39; 705/40; 235/472; 235/492; 235/493; 283/51; 283/61

(58) Field of Classification Search ............ 705/16, 705/17, 40, 41, 35, 39; 235/472, 492, 493; 283/51, 61

See application file for complete search history.

(56) References Cited

U.S. PATENT DOCUMENTS 3,573,731 A   4/1971   Schwend
(Continued)

FOREIGN PATENT DOCUMENTS

CH   689070   8/1997
(Continued)

OTHER PUBLICATIONS

USPTO; All Office Actions (Non-Final, Final, Advisory Actions, Restrictions/Elections, etc.), Notices of Allowance, 892s, 1449s and SB/08As from U.S. Appl. Nos. 10/746,781; 10/611,563; 10/192,488; 10/062,106; 10/092,681; 10/288,945; 10/302,658; 10/394,914; and 10/340,352.

(Continued)

*Primary Examiner* — Nga B. Nguyen
(74) *Attorney, Agent, or Firm* — Snell & Wilmer L.L.P.

(57) ABSTRACT

The present invention relates to a process for producing an irregularly shaped Radio Frequency operable transaction device using conventional International Standards Organization dimensions for conventional transaction cards. The invention provides for normal manufacture of a plurality of transaction cards joined together in a single sheet. The outline of a RFID transaction device is impressed in a center portion of one of the transaction cards. A RFID transaction device may then be removed, or punched out of the transaction card in accordance with the transaction device outline.

20 Claims, 9 Drawing Sheets

U.S. PATENT DOCUMENTS

| | | |
|---|---|---|
| 4,303,904 A | 12/1981 | Chasek |
| 4,475,308 A | 10/1984 | Heise et al. |
| 4,547,002 A | 10/1985 | Colgate, Jr. |
| 4,563,024 A | 1/1986 | Blyth |
| 4,583,766 A | 4/1986 | Wessel |
| 4,593,936 A | 6/1986 | Opel |
| 4,597,814 A | 7/1986 | Colgate, Jr. |
| 4,639,765 A | 1/1987 | d'Hont |
| 4,641,017 A | 2/1987 | Lopata |
| 4,672,021 A | 6/1987 | Blumel et al. |
| 4,684,795 A | 8/1987 | Colgate, Jr. |
| 4,692,394 A | 9/1987 | Drexler |
| 4,694,148 A | 9/1987 | Diekemper et al. |
| 4,697,073 A | 9/1987 | Hara |
| 4,711,690 A | 12/1987 | Haghiri-Tehrani |
| 4,739,328 A | 4/1988 | Koelle et al. |
| 4,779,898 A | 10/1988 | Berning et al. |
| 4,794,142 A | 12/1988 | Alberts et al. |
| 4,795,894 A | 1/1989 | Sugimoto et al. |
| 4,852,911 A | 8/1989 | Hoppe |
| 4,863,819 A | 9/1989 | Drexler et al. |
| 4,889,366 A | 12/1989 | Fabbiani |
| D310,386 S | 9/1990 | Michels et al. |
| 4,961,142 A | 10/1990 | Elliott et al. |
| 5,010,243 A | 4/1991 | Fukushima et al. |
| 5,023,782 A | 6/1991 | Lutz et al. |
| 5,053,774 A | 10/1991 | Schuermann et al. |
| 5,099,226 A | 3/1992 | Andrews |
| 5,101,200 A | 3/1992 | Swett |
| 5,106,125 A | 4/1992 | Antes |
| 5,111,033 A | 5/1992 | Fujita et al. |
| 5,142,383 A | 8/1992 | Mallik |
| 5,197,140 A | 3/1993 | Balmer |
| 5,212,777 A | 5/1993 | Gove et al. |
| 5,217,844 A | 6/1993 | Fukushima et al. |
| 5,221,838 A | 6/1993 | Gutman et al. |
| 5,222,282 A | 6/1993 | Sukonnik et al. |
| 5,226,989 A | 7/1993 | Sukonnik |
| 5,234,624 A | 8/1993 | Bauer et al. |
| 5,239,654 A | 8/1993 | Ing-Simmons et al. |
| 5,247,304 A | 9/1993 | d'Hont |
| 5,251,937 A | 10/1993 | Ojster |
| 5,256,473 A | 10/1993 | Kotani et al. |
| 5,272,326 A | 12/1993 | Fujita et al. |
| 5,274,392 A | 12/1993 | d'Hont et al. |
| 5,285,100 A | 2/1994 | Byatt |
| 5,300,764 A | 4/1994 | Hoshino et al. |
| 5,304,789 A | 4/1994 | Lob et al. |
| 5,305,002 A | 4/1994 | Holodak et al. |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,351,052 A | 9/1994 | d'Hont et al. |
| 5,351,142 A | 9/1994 | Cueli |
| 5,355,411 A | 10/1994 | MacDonald |
| 5,371,896 A | 12/1994 | Gove et al. |
| 5,373,303 A | 12/1994 | d'Hont |
| 5,383,687 A | 1/1995 | Suess et al. |
| 5,407,893 A | 4/1995 | Koshizuka et al. |
| 5,408,243 A | 4/1995 | d'Hont |
| 5,410,142 A | 4/1995 | Tsuboi et al. |
| 5,410,649 A | 4/1995 | Gove |
| 5,428,363 A | 6/1995 | d'Hont |
| 5,453,747 A | 9/1995 | d'Hont et al. |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | d'Hont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | d'Hont |
| 5,500,651 A | 3/1996 | Schuermann |
| 5,513,525 A | 5/1996 | Schurmann |
| 5,514,860 A | 5/1996 | Berson |
| 5,516,153 A | 5/1996 | Kaule |
| 5,518,810 A | 5/1996 | Nishihara et al. |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | d'Hont |
| 5,557,516 A | 9/1996 | Hogan |
| 5,561,430 A | 10/1996 | Knebelkamp |
| 5,563,582 A | 10/1996 | d'Hont |
| 5,569,187 A | 10/1996 | Kaiser |
| 5,572,226 A | 11/1996 | Tuttle |
| 5,577,109 A | 11/1996 | Stimson et al. |
| 5,581,630 A | 12/1996 | Bonneau, Jr. |
| 5,592,150 A | 1/1997 | d'Hont |
| 5,592,405 A | 1/1997 | Gove et al. |
| 5,594,233 A | 1/1997 | Kenneth et al. |
| 5,594,448 A | 1/1997 | d'Hont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,203 A | 3/1997 | Finkelstein et al. |
| 5,608,406 A | 3/1997 | Eberth et al. |
| 5,608,778 A | 3/1997 | Partridge, III |
| 5,611,965 A | 3/1997 | Shouji et al. |
| 5,613,146 A | 3/1997 | Gove et al. |
| 5,619,207 A | 4/1997 | d'Hont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | d'Hont |
| 5,625,370 A | 4/1997 | d'Hont |
| 5,625,695 A | 4/1997 | M'Raihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,646,607 A | 7/1997 | Schurmann et al. |
| 5,657,388 A | 8/1997 | Weiss |
| 5,660,319 A | 8/1997 | Falcone et al. |
| 5,673,106 A | 9/1997 | Thompson |
| D384,971 S | 10/1997 | Kawan |
| 5,675,342 A | 10/1997 | Sharpe |
| 5,686,920 A | 11/1997 | Hurta et al. |
| 5,691,731 A | 11/1997 | vanErven |
| 5,692,132 A | 11/1997 | Hogan |
| 5,696,913 A | 12/1997 | Gove et al. |
| 5,697,649 A | 12/1997 | Dames et al. |
| 5,698,837 A | 12/1997 | Furuta |
| 5,699,528 A | 12/1997 | Hogan |
| 5,700,037 A | 12/1997 | Keller |
| 5,701,127 A | 12/1997 | Sharpe |
| 5,704,046 A | 12/1997 | Hogan |
| 5,705,798 A | 1/1998 | Tarbox |
| 5,720,500 A | 2/1998 | Okazaki et al. |
| 5,721,781 A | 2/1998 | Deo et al. |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | d'Hont et al. |
| 5,748,137 A | 5/1998 | d'Hont |
| 5,748,737 A | 5/1998 | Daggar |
| 5,758,195 A | 5/1998 | Balmer |
| 5,761,306 A | 6/1998 | Lewis |
| 5,761,493 A | 6/1998 | Blakeley et al. |
| 5,768,609 A | 6/1998 | Gove et al. |

| Patent | Kind | Date | Inventor |
|---|---|---|---|
| 5,774,882 | A | 6/1998 | Keen et al. |
| 5,777,903 | A | 7/1998 | Piosenka |
| 5,778,067 | A | 7/1998 | Jones et al. |
| 5,785,680 | A | 7/1998 | Niezink et al. |
| 5,786,587 | A | 7/1998 | Colgate, Jr. |
| 5,789,733 | A | 8/1998 | Jachimowocz |
| 5,792,337 | A | 8/1998 | Padovani et al. |
| 5,793,324 | A | 8/1998 | Aslanidis et al. |
| 5,794,095 | A | 8/1998 | Thompson |
| 5,797,060 | A | 8/1998 | Thompson |
| 5,797,085 | A | 8/1998 | Buek et al. |
| 5,797,133 | A | 8/1998 | Jones et al. |
| 5,798,709 | A | 8/1998 | Flaxl |
| 5,808,758 | A | 9/1998 | Solmsdorf |
| 5,809,142 | A | 9/1998 | Hurta et al. |
| 5,809,288 | A | 9/1998 | Balmer |
| 5,809,633 | A | 9/1998 | Mundigl et al. |
| 5,825,007 | A | 10/1998 | Jesadanont |
| 5,825,302 | A | 10/1998 | Stafford |
| 5,826,077 | A | 10/1998 | Blakeley et al. |
| 5,828,044 | A | 10/1998 | Jun et al. |
| 5,834,756 | A | 11/1998 | Gutman et al. |
| 5,841,364 | A | 11/1998 | Hagl et al. |
| 5,842,088 | A | 11/1998 | Thompson |
| 5,844,218 | A | 12/1998 | Kawan et al. |
| 5,844,230 | A | 12/1998 | Lalonde |
| 5,845,267 | A | 12/1998 | Ronen |
| 5,851,149 | A | 12/1998 | Xidos et al. |
| 5,854,891 | A | 12/1998 | Postlewaite et al. |
| 5,856,048 | A | 1/1999 | Tahara et al. |
| 5,857,709 | A | 1/1999 | Chock |
| 5,858,006 | A | 1/1999 | Van der AA et al. |
| 5,859,779 | A | 1/1999 | Giordano et al. |
| 5,864,323 | A | 1/1999 | Berthon |
| 5,867,100 | A | 2/1999 | d'Hont |
| 5,870,031 | A | 2/1999 | Kaiser et al. |
| 5,870,915 | A | 2/1999 | d'Hont |
| D406,861 | S | 3/1999 | Leedy, Jr. |
| 5,878,215 | A | 3/1999 | Kling et al. |
| 5,878,403 | A | 3/1999 | DeFrancesco et al. |
| 5,880,675 | A | 3/1999 | Trautner |
| 5,881,272 | A | 3/1999 | Balmer |
| 5,886,333 | A | 3/1999 | Miyake |
| 5,887,266 | A | 3/1999 | Heinonen et al. |
| 5,890,137 | A | 3/1999 | Koreeda |
| D408,054 | S | 4/1999 | Leedy, Jr. |
| 5,898,783 | A | 4/1999 | Rohrbach |
| 5,900,954 | A | 5/1999 | Katz et al. |
| 5,903,830 | A | 5/1999 | Joao et al. |
| 5,905,798 | A | 5/1999 | Nerlikar et al. |
| 5,912,678 | A | 6/1999 | Saxena et al. |
| 5,920,628 | A | 7/1999 | Indeck et al. |
| 5,928,788 | A | 7/1999 | Riedl |
| 5,929,801 | A | 7/1999 | Aslanidis et al. |
| 5,931,917 | A | 8/1999 | Nguyen et al. |
| 5,932,870 | A | 8/1999 | Berson |
| 5,933,624 | A | 8/1999 | Balmer |
| 5,943,624 | A | 8/1999 | Fox et al. |
| 5,948,116 | A | 9/1999 | Aslanidis et al. |
| 5,953,512 | A | 9/1999 | Cai et al. |
| 5,955,717 | A | 9/1999 | Vanstone |
| 5,955,969 | A | 9/1999 | d'Hont |
| 5,956,024 | A | 9/1999 | Strickland et al. |
| 5,963,924 | A | 10/1999 | Williams et al. |
| 5,970,148 | A | 10/1999 | Meier |
| 5,971,276 | A | 10/1999 | Sano et al. |
| RE36,365 | E | 11/1999 | Levine et al. |
| 5,978,348 | A | 11/1999 | Tamura |
| 5,978,840 | A | 11/1999 | Nguyen et al. |
| 5,983,208 | A | 11/1999 | Haller et al. |
| 5,987,140 | A | 11/1999 | Rowney et al. |
| 5,987,155 | A | 11/1999 | Dunn et al. |
| 5,987,498 | A | 11/1999 | Athing et al. |
| 5,989,950 | A | 11/1999 | Wu |
| 5,991,608 | A | 11/1999 | Leyten |
| 5,991,750 | A | 11/1999 | Watson |
| 5,996,076 | A | 11/1999 | Rowney et al. |
| 6,002,438 | A | 12/1999 | Hocevar et al. |
| 6,002,767 | A | 12/1999 | Kramer |
| 6,003,014 | A | 12/1999 | Lee et al. |
| 6,005,942 | A | 12/1999 | Chan et al. |
| 6,006,216 | A | 12/1999 | Griffin et al. |
| 6,012,049 | A | 1/2000 | Kawan |
| 6,014,645 | A | 1/2000 | Cunningham |
| 6,018,717 | A | 1/2000 | Lee et al. |
| 6,024,286 | A | 2/2000 | Bradley et al. |
| 6,029,149 | A | 2/2000 | Dykstra et al. |
| 6,038,584 | A | 3/2000 | Balmer |
| 6,047,888 | A | 4/2000 | Dethloff |
| 6,052,675 | A | 4/2000 | Checchio |
| 6,064,320 | A | 5/2000 | d'Hont et al. |
| 6,070,003 | A | 5/2000 | Gove et al. |
| 6,072,870 | A | 6/2000 | Nguyen et al. |
| 6,073,840 | A | 6/2000 | Marion |
| 6,078,888 | A | 6/2000 | Johnson, Jr. |
| RE36,788 | E | 7/2000 | Mansvelt et al. |
| 6,088,686 | A | 7/2000 | Walker et al. |
| 6,092,057 | A | 7/2000 | Zimmerman et al. |
| 6,101,174 | A | 8/2000 | Langston |
| 6,102,162 | A | 8/2000 | Teicher |
| 6,102,672 | A | 8/2000 | Woollenweber |
| 6,105,008 | A | 8/2000 | Davis et al. |
| 6,105,013 | A | 8/2000 | Curry et al. |
| 6,105,865 | A | 8/2000 | Hardesty |
| 6,109,525 | A | 8/2000 | Blomqvist et al. |
| 6,112,152 | A | 8/2000 | Tuttle |
| 6,115,360 | A | 9/2000 | Quay et al. |
| 6,116,423 | A | 9/2000 | Troxtell, Jr. et al. |
| 6,116,505 | A | 9/2000 | Withrow |
| 6,118,189 | A | 9/2000 | Flaxl |
| 6,121,544 | A | 9/2000 | Petsinger |
| 6,123,223 | A | 9/2000 | Watkins |
| 6,129,274 | A | 10/2000 | Suzuki |
| 6,133,834 | A | 10/2000 | Eberth et al. |
| 6,138,913 | A | 10/2000 | Cyr et al. |
| 6,141,651 | A | 10/2000 | Riley et al. |
| 6,155,168 | A | 12/2000 | Sakamoto |
| 6,167,236 | A | 12/2000 | Kaiser et al. |
| 6,177,860 | B1 | 1/2001 | Cromer et al. |
| 6,179,205 | B1 | 1/2001 | Sloan |
| 6,179,206 | B1 | 1/2001 | Matsumori |
| 6,188,994 | B1 | 2/2001 | Egendorf |
| 6,192,255 | B1 | 2/2001 | Lewis et al. |
| 6,196,465 | B1 | 3/2001 | Awano |
| 6,198,728 | B1 | 3/2001 | Hulyalksr et al. |
| 6,198,875 | B1 | 3/2001 | Edenson et al. |
| 6,202,927 | B1 | 3/2001 | Bashan et al. |
| 6,205,151 | B1 | 3/2001 | Quay et al. |
| 6,206,293 | B1 | 3/2001 | Gutman et al. |
| 6,215,437 | B1 | 4/2001 | Schurmann et al. |
| 6,216,219 | B1 | 4/2001 | Cai et al. |
| 6,219,439 | B1 | 4/2001 | Burger |
| D442,627 | S | 5/2001 | Webb et al. |
| D442,629 | S | 5/2001 | Webb et al. |
| 6,223,984 | B1 | 5/2001 | Renner et al. |
| 6,226,382 | B1 | 5/2001 | M'Raihi et al. |
| 6,230,270 | B1 | 5/2001 | Laczko, Sr. |
| 6,232,917 | B1 | 5/2001 | Baumer et al. |
| 6,233,683 | B1 | 5/2001 | Chan et al. |
| 6,237,848 | B1 | 5/2001 | Everett |
| 6,239,675 | B1 | 5/2001 | Flaxl |
| 6,240,187 | B1 | 5/2001 | Lewis |
| 6,248,199 | B1 | 6/2001 | Smulson .................. 156/244.12 |
| 6,248,314 | B1 | 6/2001 | Nakashimada et al. |
| 6,255,031 | B1 | 7/2001 | Yao et al. |
| 6,257,486 | B1 | 7/2001 | Teicher et al. |
| 6,259,769 | B1 | 7/2001 | Page |
| 6,260,026 | B1 | 7/2001 | Tomida et al. |
| 6,260,088 | B1 | 7/2001 | Gove et al. |
| 6,264,106 | B1 | 7/2001 | Bridgelall |
| 6,266,754 | B1 | 7/2001 | Laczko, Sr. et al. |
| 6,273,335 | B1 | 8/2001 | Sloan |
| 6,277,232 | B1 | 8/2001 | Wang et al. |
| 6,282,522 | B1 | 8/2001 | Davis et al. |
| D447,515 | S | 9/2001 | Faenza, Jr. et al. |
| 6,286,763 | B1 | 9/2001 | Reynolds et al. |
| 6,289,324 | B1 | 9/2001 | Kawan |
| 6,290,137 | B1 | 9/2001 | Kiekhaefer |

| | | |
|---|---|---|
| 6,296,188 B1 | 10/2001 | Kiekhaefer |
| 6,315,193 B1 | 11/2001 | Hogan |
| 6,317,721 B1 | 11/2001 | Hurta et al. |
| 6,318,636 B1 | 11/2001 | Reynolds et al. |
| 6,323,566 B1 | 11/2001 | Meier |
| 6,325,285 B1 | 12/2001 | Baratelli |
| 6,326,934 B1 | 12/2001 | Kinzie |
| 6,342,844 B1 | 1/2002 | Rozin |
| 6,364,208 B1 | 4/2002 | Stanford et al. |
| 6,367,011 B1 | 4/2002 | Lee et al. |
| 6,374,245 B1 | 4/2002 | Park |
| 6,377,034 B1 | 4/2002 | Ivanov |
| 6,388,533 B2 | 5/2002 | Swoboda |
| 6,390,375 B2 | 5/2002 | Kayanakis |
| 6,400,272 B1 | 6/2002 | Holtzman et al. |
| 6,402,028 B1 | 6/2002 | Graham, Jr. et al. |
| 6,411,611 B1 | 6/2002 | Van der Tuijn |
| 6,415,978 B1 | 7/2002 | McAllister |
| 6,422,464 B1 | 7/2002 | Terranova |
| 6,424,029 B1 | 7/2002 | Giesler |
| 6,442,532 B1 | 8/2002 | Kawan |
| 6,457,996 B1 | 10/2002 | Shih |
| 6,466,804 B1 | 10/2002 | Pecen et al. |
| 6,471,127 B2 | 10/2002 | Pentz et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,481,621 B1 | 11/2002 | Herrendoerfer et al. |
| 6,481,632 B2 | 11/2002 | Wentker et al. |
| 6,484,937 B1 | 11/2002 | Devaux et al. |
| 6,490,443 B1 | 12/2002 | Freeny, Jr. |
| 6,491,229 B1 | 12/2002 | Berney |
| 6,494,380 B2 | 12/2002 | Jarosz |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawara |
| 6,520,542 B2 | 2/2003 | Thompson et al. ............ 283/51 |
| 6,529,880 B1 | 3/2003 | McKeen et al. |
| 6,535,726 B1 | 3/2003 | Johnson |
| 6,546,373 B1 | 4/2003 | Cerra |
| 6,547,133 B1 | 4/2003 | DeVries, Jr. et al. |
| 6,549,912 B1 | 4/2003 | Chen |
| 6,560,581 B1 | 5/2003 | Fox et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,588,660 B1 | 7/2003 | Buescher et al. |
| 6,589,119 B1 | 7/2003 | Orus et al. |
| 6,608,995 B1 | 8/2003 | Kawasaki et al. |
| 6,609,655 B1 | 8/2003 | Harrell |
| 6,623,039 B2 | 9/2003 | Thompson et al. ............ 283/61 |
| 6,626,356 B2 | 9/2003 | Davenport et al. |
| 6,628,961 B1 | 9/2003 | Ho et al. |
| 6,650,887 B2 | 11/2003 | McGregor et al. |
| 6,665,405 B1 | 12/2003 | Lenstra |
| 6,674,786 B1 | 1/2004 | Nakamura et al. |
| 6,679,427 B1 | 1/2004 | Kuroiwa |
| 6,684,269 B2 | 1/2004 | Wagner |
| 6,687,714 B1 | 2/2004 | Kogen et al. |
| 6,690,930 B1 | 2/2004 | Dupre |
| 6,693,513 B2 | 2/2004 | Tuttle |
| 6,705,530 B2 | 3/2004 | Kiekhaefer |
| 6,711,262 B1 | 3/2004 | Watanen |
| 6,732,936 B1 | 5/2004 | Kiekhaefer |
| 6,742,120 B1 | 5/2004 | Markakis et al. |
| 6,760,581 B2 | 7/2004 | Dutta |
| 6,769,718 B1 | 8/2004 | Warther et al. ................ 283/61 |
| 6,771,981 B1 | 8/2004 | Zalewski et al. |
| 6,789,012 B1 | 9/2004 | Childs et al. |
| 6,851,617 B2 | 2/2005 | Saint et al. ................... 235/492 |
| 6,853,087 B2 | 2/2005 | Neuhaus et al. ............. 257/778 |
| 6,994,262 B1 | 2/2006 | Warther ........................ 235/492 |
| 7,093,767 B2 | 8/2006 | Faenza, Jr. et al. |
| 7,827,106 B2 * | 11/2010 | Saunders ....................... 705/41 |
| 2001/0013542 A1 | 8/2001 | Horowitz et al. |
| 2001/0024157 A1 | 9/2001 | Hansmann et al. |
| 2001/0034565 A1 | 10/2001 | Leatherman |
| 2001/0039617 A1 | 11/2001 | Buhrlen et al. |
| 2002/0011519 A1 | 1/2002 | Shults |
| 2002/0028704 A1 | 3/2002 | Bloomfield et al. |
| 2002/0035548 A1 | 3/2002 | Hogan et al. |
| 2002/0052839 A1 | 5/2002 | Takatori |
| 2002/0062284 A1 | 5/2002 | Kawan |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0092914 A1 | 7/2002 | Pentz et al. |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0109580 A1 | 8/2002 | Shreve et al. |
| 2002/0111210 A1 | 8/2002 | Luciano, Jr. et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |
| 2002/0131567 A1 | 9/2002 | Maginas |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0166891 A1 | 11/2002 | Stoutenburg et al. |
| 2002/0176522 A1 | 11/2002 | Fan |
| 2002/0178063 A1 | 11/2002 | Gravelle et al. |
| 2002/0178369 A1 | 11/2002 | Black |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0009382 A1 | 1/2003 | D'Arbelott et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0025600 A1 | 2/2003 | Blanchard |
| 2003/0046228 A1 | 3/2003 | Berney |
| 2003/0057226 A1 | 3/2003 | Long |
| 2003/0057278 A1 | 3/2003 | Wong |
| 2003/0069828 A1 | 4/2003 | Blazey et al. |
| 2003/0069846 A1 | 4/2003 | Marcon |
| 2003/0112972 A1 | 6/2003 | Hattick et al. |
| 2003/0120554 A1 | 6/2003 | Hogan et al. |
| 2003/0121969 A1 | 7/2003 | Wankmueller |
| 2003/0132284 A1 | 7/2003 | Reynolds et al. |
| 2003/0140228 A1 | 7/2003 | Binder |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0233334 A1 | 12/2003 | Smith |
| 2004/0010462 A1 | 1/2004 | Moon et al. |
| 2004/0015451 A1 | 1/2004 | Sahota et al. |
| 2004/0029569 A1 | 2/2004 | Khan et al. |
| 2004/0030601 A1 | 2/2004 | Pond et al. |

| | | | | | | |
|---|---|---|---|---|---|---|
| 2004/0039860 | A1 | 2/2004 | Mills et al. | JP | 6191137 | 7/1994 |
| 2004/0139021 | A1 | 7/2004 | Reed et al. | JP | 6234287 | 8/1994 |
| 2005/0017068 | A1 | 1/2005 | Zalewski et al. | JP | 07173358 | 7/1995 |
| | | | | JP | 7173358 | 7/1995 |

FOREIGN PATENT DOCUMENTS

| | | | | | |
|---|---|---|---|---|---|
| CH | 689070 | 8/1998 | JP | 7205569 | 8/1995 |
| CH | 689070 | 9/1998 | JP | 09052240 | 2/1997 |
| CH | 689680 | 8/1999 | JP | 9274640 | 10/1997 |
| DE | 2847756 | 5/1980 | JP | 10129161 | 5/1998 |
| DE | 3636921 | 4/2005 | JP | 11227367 | 8/1999 |
| EP | 0181770 | 5/1986 | JP | 2000-1109 A | 1/2000 |
| EP | 0343829 | 11/1989 | JP | 200011109 | 1/2000 |
| EP | 0354817 | 2/1990 | JP | 2000015288 A | 1/2000 |
| EP | 0 358 525 A2 | 3/1990 | JP | 2000-40181 A | 2/2000 |
| EP | 0358525 | 3/1990 | JP | 200067312 A | 3/2000 |
| EP | 0368570 | 5/1990 | JP | 2000177229 | 6/2000 |
| EP | 0388090 | 9/1990 | JP | 2000207641 A | 7/2000 |
| EP | 0 424 726 A1 | 10/1990 | JP | 2001-5931 A | 1/2001 |
| EP | 0411602 | 2/1991 | JP | 2001283122 A | 10/2001 |
| EP | 0403134 | 1/1992 | JP | 2001315475 | 11/2001 |
| EP | 0481388 | 4/1992 | JP | 2002274087 | 9/2002 |
| EP | 0473998 | 3/1993 | WO | 8100776 | 3/1981 |
| EP | 0531605 | 3/1993 | WO | 8903760 | 5/1989 |
| EP | 0552047 | 7/1993 | WO | 9008661 | 8/1990 |
| EP | 0560318 | 9/1993 | WO | 9108910 | 6/1991 |
| EP | 0568185 | 11/1993 | WO | 9216913 | 10/1992 |
| EP | 0657297 | 6/1995 | WO | 9532919 | 12/1995 |
| EP | 0721850 | 7/1996 | WO | WO 95/32919 | 12/1995 |
| EP | 0780839 | 6/1997 | WO | 9618972 | 6/1996 |
| EP | 0789316 | 8/1997 | WO | 9903057 | 1/1999 |
| EP | 0854461 | 7/1998 | WO | WO 99/03057 A1 | 1/1999 |
| EP | 0866420 | 9/1998 | WO | 9912136 | 3/1999 |
| EP | 0894620 | 2/1999 | WO | 9914055 | 3/1999 |
| EP | 0916519 | 5/1999 | WO | 9947983 | 9/1999 |
| EP | 0 933 717 A2 | 8/1999 | WO | WO 00/10144 A1 | 2/2000 |
| EP | 0 956 818 A1 | 11/1999 | WO | WO 00/38088 A1 | 6/2000 |
| EP | 0 959 440 A2 | 11/1999 | WO | WO 01/04825 A1 | 1/2001 |
| EP | 0 984 404 A2 | 3/2000 | WO | 0115098 | 3/2001 |
| EP | 1 016 947 A2 | 7/2000 | WO | WO 01/15098 A1 | 3/2001 |
| EP | 1016947 | 7/2000 | WO | 0143095 | 6/2001 |
| EP | 1 039 403 A2 | 9/2000 | WO | WO 01/43095 A2 | 6/2001 |
| EP | 1 104 909 A2 | 6/2001 | WO | 0172224 | 10/2001 |
| EP | 1 113 387 A2 | 7/2001 | WO | 0177856 | 10/2001 |
| EP | 1 199 684 A2 | 4/2002 | WO | 0180473 | 10/2001 |
| EP | 1199684 | 4/2002 | WO | WO 01/72224 A1 | 10/2001 |
| EP | 1222620 | 7/2002 | WO | WO 01/77856 A1 | 10/2001 |
| EP | 1 251 450 A1 | 10/2002 | WO | WO 01/80473 A2 | 10/2001 |
| GB | 1371254 | 10/1974 | WO | 0186535 | 11/2001 |
| GB | 2086110 | 5/1982 | WO | 0190962 | 11/2001 |
| GB | 2108906 | 5/1983 | WO | WO 01/86535 A1 | 11/2001 |
| GB | 2108906 | 5/1985 | WO | WO 01/90962 A1 | 11/2001 |
| GB | 2240948 | 8/1991 | WO | 0195243 | 12/2001 |
| GB | 2347537 | 9/2000 | WO | WO 01/95243 A2 | 12/2001 |
| JP | 8100776 | 3/1981 | WO | 0201485 | 1/2002 |
| JP | 6243774 | 3/1987 | WO | WO 02/01485 A1 | 1/2002 |
| JP | 62264999 | 11/1987 | WO | 0213134 | 2/2002 |
| JP | 63071794 | 1/1988 | WO | WO 02/13134 A2 | 2/2002 |
| JP | 63098689 | 4/1988 | WO | WO 02/21903 A1 | 3/2002 |
| JP | 63072721 | 5/1988 | WO | 02063545 | 8/2002 |
| JP | 63175987 | 7/1988 | WO | 02065246 | 8/2002 |
| JP | 644934 | 1/1989 | WO | 02065404 | 8/2002 |
| JP | 6487395 | 3/1989 | WO | WO 02/063545 A2 | 8/2002 |
| JP | 8903760 | 3/1989 | WO | WO 02/065246 A2 | 8/2002 |
| JP | 64087396 | 3/1989 | WO | WO 02/065404 A2 | 8/2002 |
| JP | 64087397 | 3/1989 | WO | 02069221 | 9/2002 |
| JP | 02130737 | 5/1990 | WO | 02073512 | 9/2002 |
| JP | 2130737 | 5/1990 | WO | WO 02/069221 A1 | 9/2002 |
| JP | 02252149 | 10/1990 | WO | WO 02/073512 A1 | 9/2002 |
| JP | 2252149 | 10/1990 | WO | 02086665 | 10/2002 |
| JP | 03290780 | 12/1991 | WO | WO 02/086665 A2 | 10/2002 |
| JP | 3290780 | 12/1991 | WO | 02091281 | 11/2002 |
| JP | 04303692 | 10/1992 | WO | WO 02/091281 A2 | 11/2002 |
| JP | 4303692 | 10/1992 | WO | 02097575 | 12/2002 |
| JP | 569689 | 3/1993 | WO | 02101670 | 12/2002 |
| JP | 05069689 | 3/1993 | WO | WO 02/097575 A2 | 12/2002 |
| JP | 5254283 | 9/1993 | WO | WO 02/101670 A2 | 12/2002 |
| JP | 05254283 | 10/1993 | WO | 03007623 | 1/2003 |
| JP | 6183187 | 7/1994 | | | |
| JP | 06191137 | 7/1994 | | | |

OTHER PUBLICATIONS

Ex Parte Quayle Office Action issued Dec. 14, 2005, for U.S. Appl. No. 10/708,549.

"What's New: Timex Watch Features Speedpass System", http://www.speedpass.com/news/article.jsp?id=51 (1 page).

"Physical Reality: A Second Look", Ken Sharp, Senior Technical Editor, http://www.idsystems.com/reader/1999_03/phys0399_pt2/phys0399_pt2.htm (6 pages).

"'Magic Wands' to Speed Mobile Sales", BobBrewin, Jan. 15, 2001, http://www.computerworld.com/mobiletopics/mobile/story/1,10801,563300.html (4 pages).

"Mobile Speedpass Goes Global as Mobil Singapore Rolls Out Asia's First RFID-Based Pay-At-The-Pump System", Press-Release, Apr. 5, 1999, http://www.ti.com/tiris/docs/news_releases/rell2.htm (3 pages).

"Speedpass Unleashed", Jun. 4, 2002 http://www.cardweb.com/cardtrak/news/cf2_20a_97.html (2 pages).

Prophecy Central Update #9, Oct. 10, 1997, http://www.bible-prophecy.com/pcu9.htm (5 pages).

International Newsletter of the TI RFID Group, Issue 20, 2000 (12 pages).

"CES: Microsoft's Spot Technology has Humble Origins", by James Niccolai, Jan. 10, 2003, htm://archive.inforworld.com/articles/hn/xml/03/01/10/030110hnspot.xml?s=IDGNS (3 pages).

"Microsoft: See SPOT Run on Your Wrist", by Richard Shim, Jun. 5, 2003, http://news.com.com/2100-1041_3-1013442.html?tag=fd_top (1 page).

"Networking: Microsoft SPOT", by.Jeremy A. Kaplan, Jul. 1, 2003, http://www.pcmag.com/print_article/0,3048;a=43561,00.asp (2 pages).

"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to test its QuickWave RFID payment card for another three months", RFID Journal, Jan. 23, 2003.

"MasterCard to Test RFID Card: Pilot will test whether consumers, merchants and credit card issuers value "contactless" payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are teaming up to create an electronic ticket", RFID Journal, Aug. 31, 2002.

"Security for Wireless Java: NTRU, a startup that offers security software, has relased of Java version of its NTRU encryption algorithm", RFID Journal, Jun. 27, 2002.

"Making RFID Payments Ubiquitous: Philips and Visa want people to be able to pay for goods and services anywhere by using RFID chips embedded in the phones and other devices", RFID Journal, Jun. 2, 20003.

"RFID Smart Cards Gain Ground: The convenience of contactless transactions is driving widespread adoption of contactless smart cards", RFID Journal, Apr. 9, 2003.

"TI Embarces Prox Card Standard: Texas Instruments ISO 14443 payment platform promises faster data transfer rates and more security", RFID Journal, Mar. 6, 2003.

"Multiple Frequency Transponders: Volume production of dual-band RFID chips begins"; Frontline Solutions, Jul. 16, 2003.

Functional Specification, Standard Card IC MF1 IC S50, Philips Semiconductors, Product Specification Rev. 5.1 May 2001.

International Search Report and Written Opinion of the International Searching Authority, PCT/US05/26067, May 23, 2007.

* cited by examiner

SYSTEM AND METHOD FOR MANUFACTURING A PUNCH-OUT RFID TRANSACTION DEVICE

CROSS-REFERENCE TO RELATED APPLICATIONS

This disclosure is a continuation of and claims priority to U.S. Ser. No. 10/746,781, entitled "SYSTEM AND METHOD FOR MANUFACTURING A PUNCH-OUT RFID TRANSACTION DEVICE," filed on Dec. 24, 2003. The '781 disclosure is a continuation-in-part of and claims priority to U.S. Pat. No. 7,306,158, entitled "CLEAR CONTACTLESS CARD," issued on Dec. 11, 2007 (aka U.S. Ser. No. 10/611,563, filed on Jun. 30, 2003). The '158 patent claims priority to U.S. Pat. No. 7,239,226, entitled "SYSTEM AND METHOD FOR PAYMENT USING RADIO FREQUENCY IDENTIFICATION IN CONTACT AND CONTACTLESS TRANSACTIONS," issued on Jul. 3, 2007 (aka U.S. Ser. No. 10/192,488, filed on Jul. 9, 2002). The '781 disclosure claims priority to U.S. Pat. No. 6,749,123, entitled "TRANSACTION CARD," issued on Jun. 15, 2004 (aka U.S. Ser. No. 10/062,106, filed Jan. 31, 2002). The '781 disclosure claims priority to U.S. Pat. No. 6,764,014, entitled "TRANSACTION CARD," issued on Jul. 20, 2004 (aka U.S. Ser. No. 10/092,681, filed Mar. 7, 2002). The '781 disclosure claims priority to U.S. Ser. No. 10/288,945, entitled "PERFORATED TRANSACTION CARD," filed Nov. 6, 2002. The '781 disclosure claims priority to U.S. Ser. No. 10/302,658, entitled "TRANSACTION CARD WITH DUAL IC CHIPS," filed Nov. 22, 2002. The '781 disclosure claims priority to U.S. Pat. No. 7,377,443 entitled "TRANSACTION CARD," issued on May 27, 2008 (aka U.S. Ser. No. 10/394,914, filed Mar. 21, 2003). The '781 disclosure '158 patent claims priority to U.S. Provisional Patent Application No. 60/427,977, "CONTACTLESS TRANSPARENT TRANSACTION CARD," filed on Nov. 20, 2002. The '226 patent claims priority to U.S. Provisional Patent Application No. 60/304,216, entitled "SYSTEM AND METHOD FOR RFID PAYMENTS," filed Jul. 10, 2001. The '781 disclosure claims priority to U.S. Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003. The '352 disclosure claims priority to U.S. Provisional Patent Application No. 60/396,577, entitled "SYSTEM AND METHOD FOR PAYMENT USING RADIO FREQUENCY IDENTIFICATION IN CONTACT AND CONTACTLESS TRANSACTIONS" filed on Jul. 16, 2002. All of which are hereby incorporated by reference.

FIELD OF INVENTION

The present invention generally relates to transaction devices, and more particularly, to a system and method for fabricating a Radio Frequency operable transaction device.

BACKGROUND OF THE INVENTION

For many years personal checks, travelers checks, money orders, traditional currency and the like were the most popular means for paying for goods or services. These payment means, however, were often difficult or impossible to replace if lost or stolen. This is typically true, since these means of payment were disposable in that they were typically single-use devices, meaning that once the devices were used, the ability to reuse the devices was instantly lost to the user.

As such, recent years has seen the development of transaction cards, such as credit cards, debit cards, smart cards, pre-paid cards and the like as a popular substitute for cash or personal checks. Initial transaction cards were typically restricted to select restaurants and hotels and were often limited to an exclusive class of individuals.

With the advent of plastic credit cards, the use of transaction cards has rapidly increased world-wide. Transaction cards are not only information carriers, but also typically allow a consumer to pay for goods and services without the need to constantly possess cash, or if a consumer needs cash, transaction cards allow access to funds through an automatic teller machine (ATM). Transaction cards also reduce the exposure to the risk of cash loss through theft and reduce the need for currency exchanges when traveling to various foreign countries. Due to the advantages of transaction cards, hundreds of millions of cards are now produced and issued annually.

The vast number of cards produced demands international standards for card dimensions (e.g., length, width, thickness, shape). For example, the International Standardization Organization ("ISO") standardizes a transaction card's dimensions under standard ISO/IEC 7812, a standard which is accepted industry wide. As such, the machines used to manufacture a transaction cards vary little from one transaction card manufacture to another, in order that each manufacturer conforms to the industry standard.

As the number of transaction cards issued increased, so did the administrative and security issues surrounding transaction card transactions. Security concerns such as, fraudulent charges, credits, merchant settlement, and reimbursements, etc., have increased due to the increasing use of transaction cards. As a consequence, the transaction card industry started to develop more sophisticated transaction cards which allowed for the reading, transmission, and authorization of transaction card data, while lessening the elevating security concerns. For example, many transaction card manufacturers are providing transaction devices capable of being used in place of traditional transaction cards. Initially, the replacement transaction devices where manufactured in the form of smart cards, which were capable of transferring user information without the user every having to lose physical control of the device.

While the advent of smart cards helped to alleviate some of the security issues surrounding transaction devices, smart cards did little to address fraud issues associated with a lost or stolen transaction card. This is true because the smart cards where manufactured with the same size dimensions as traditional transaction cards. More particularly, while the identical size dimensions between the traditional transaction card and the smart card has the cost advantage associated with permitting a card manufacturer to manufacture smart cards on traditional transaction card fabrication machinery, the disadvantage is that the smart card users typically did little more to secure the smart card than what was done to secure a traditional transaction card.

Thus, to alleviate the fraud cost associated with a lost or stolen transaction device, transaction card providers are searching for suitable technology which would permit a transaction to be completed without the cardholder having to relinquish control of the card. One such technology is radio frequency identification (RFID) technology.

Like barcode and voice data entry, RFID is a contactless information acquisition technology. RFID systems are wireless, and are usually extremely effective in hostile environments where conventional acquisition methods fail.

In general, RFID technology permits a card manufacturer to provide for a dimensionally smaller transaction device than a smart card or traditional transaction card. RFID technology, therefore, is better suited for securing against loss or theft. For example, the RFID technology may be embodied in a form factor attachable to the account holder's person or to an often used personal article, such as a key chain, fob or tag. In this way, the user has increased security against loss, since the personal article is handled frequently.

One of the more visible uses of the RFID technology is found in the introduction of Exxon/Mobil's Speedpass™ and Shell's EasyPay™ products. These products use transponders placed in a fob or tag of irregular shape which enables automatic identification of the user when the fob is presented at a Point of Sale (POS) device. Fob identification data is typically passed to a third party server database, where the identification data is referenced to a customer (e.g., user) credit or debit account for completion of a transaction.

By providing a RFID transaction device (e.g. fob) as described above, transaction account providers are able to attract account users in increasing numbers. The account users often prefer account providers which offer the RFID transaction device option because of the convenience of use and the security using a RF transaction fob provides. As such, because of the increased popularity and benefits associated with RFID transaction devices, many banking and financing institutions, department stores, petroleum companies and other organizations have developed their own RFID transaction devices for use by the organization's consumers.

One advantage of the RFID transaction devices, such as, a key chain fob, is that the key chain fob may be easily secured because of its diminutive size as compared to traditional smart cards and transaction cards. For manufactures, however, the disadvantage is that since the key chain fobs may be irregular shape, the card manufacturer cannot typically use the same machinery to cut the fobs as the manufacturer used to cut the traditional cards and smart cards. Instead, the card manufacturer must retrofit the existing machinery to cut the irregularly shaped fobs, or the producer must obtain machinery specially manufactured for cutting the fob shape. This, in turn, increases the manufactures transaction device fabrication costs.

SUMMARY OF THE INVENTION

The present invention relates to a system and method for manufacturing contactless RFID operable transaction device and methods of using the same. Specifically, the present invention relates to a method of providing a RFID transaction device which may be manufactured using conventional RFID transaction device manufacturing equipment.

It is, therefore, an object of the present invention to provide a transaction device manufacturing system and method which requires little retrofitting of conventional transaction card manufacturing machinery.

In one embodiment, the present invention relates to a process for producing a transaction device, such as a key fob, having any one or more features, such as a holographic foil, integrated circuit chip, silver magnetic stripe with text on the magnetic stripe, opacity gradient, perforations included in the transparent device body for forming an outline of a shape, and an "active thru" date on the front of the device.

The RFID transaction device of the present invention may use RFID technology to initiate and complete financial transactions. In that regard, the transaction device may include an RF transponder and antenna in the device body, which is typically included during the transaction device fabrication.

The system in which the RFID transaction device may be used may include a RFID reader operable to provide a RF interrogation signal for powering the transaction device transponder system, receiving a transponder system RF signal including transponder system account data, and providing transponder system account data relative to the transponder system RF signal. The RFID reader may include an RFID protocol/sequence controller in electrical communication with one or more interrogators for providing an interrogation signal to a transponder, a RFID authentication circuit for authenticating the signal received from the transponder, and a serial or parallel interface for interfacing with a point of interaction device.

The RFID reader may be configured to send a standing RFID recognition signal which may be continuously or intermittently transmitted from the RFID reader via radio frequency (or electromagnetic) propagation. In one instance, the transaction device may be placed within proximity to the RFID reader such that the RFID recognition signal may interrogate the device and initialize device identification procedures.

In one exemplary transaction device manufacturing method, a plurality of transaction devices is manufactured simultaneously conjoined on a single sheet. The sheet of transaction devices may be manufactured under any conventional method. Preferably, the sheet is manufactured including RFID operable transaction devices. More preferably, the sheet is manufactured including RFID operable transaction devices including conventional RFID circuitry as described above.

Once the sheet of transaction devices is manufactured, the sheet may then be fed through a stamping device for imprinting a removable transaction device (e.g., key fob) outlined on the single sheet. The single sheet may then be cut into conventional transaction card dimensions, such as, for example, the ISO/TEC 7812 standardized card dimensions. Preferably, sheet is cut such that the transaction card body resulting from the cutting process includes the removable transaction device (e.g., key fob) outline impressed completely within its perimeter. The resulting combination of the card body including the transaction device outline may then be delivered to a consumer, who may remove ("punch-out") the removable transaction device outline. Once removed, the RFID transaction device may be used to complete a RF transaction.

In another exemplary embodiment, the transaction card body is cut and the transaction device outline is imprinted simultaneously. In this instance, the card manufacturer may utilize a cutting machine configured to imprint the removable transaction device outline when the cutting of the card body is performed. In this way, only one machine action is necessary to cut and imprint the removable transaction device outline.

In yet another exemplary embodiment, the transaction card body includes RFID circuitry completely contained within its card body. A Suitable form factor outline such as a key fob outline may be pressed within the perimeter of each of the plurality of transaction card body outlines. The form factor outline may be pressed into the card body such that the RFID circuitry is contained within the form factor outline. The form factor outline may then be "punched out" of the transaction card body outline, such that an independent RFID transaction device shaped in the form factor outline is provided.

In yet another exemplary embodiment of the invention, the transaction device manufacturer may use a RFID transaction device sheet, which may be cut in the traditional credit card transaction device shape or any shape as desired for a RFID transaction device (e.g., teardrop fob shaped). In this way, a transaction device manufacturer may form both transaction cards and irregularly shaped RFID transaction devices from substantially identically made RFID transaction device sheets, simply by designating the proper design to be made using a particular sheet.

Additional features and advantages of the present invention are described in, and will be apparent from, the detailed description of the present exemplary embodiments and from the drawings.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

Figure 1:
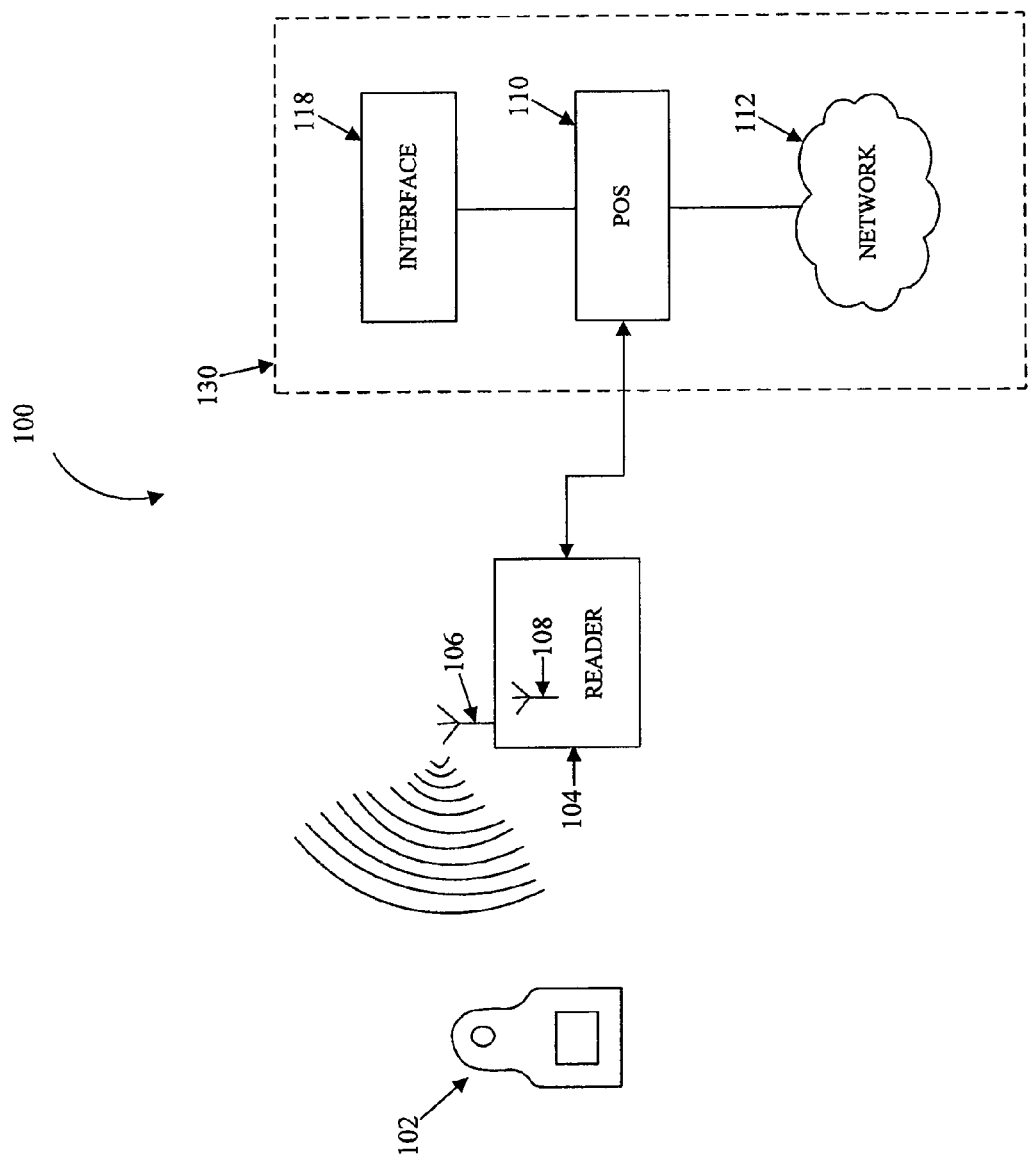
FIG. 1 illustrates an exemplary RF transaction device system in accordance with an exemplary embodiment of the present invention.

The present invention relates to contactless transaction devices and methods of making and using the same. Specifically, the present invention relates to a system and method for manufacturing a RFID transaction device using conventional transaction card manufacturing procedures. The present invention addresses the shortcomings in the prior art by providing a cost effective method for manufacturing irregular shaped RFID transaction device.

The transaction device in accordance with this invention may include means for conducting a transaction in a contactless environment. For example, the transaction device may include a RF operable transponder system, which may include a RF-based chip and antenna embedded therein. As used herein, the transponder system, antenna, and other internal transaction device circuitry supporting a RFID transaction may be called "RFID circuitry".

The contactless transaction device can be utilized to efficiently conduct cashless transactions at, for example, a merchant POS, while permitting the accountholder to maintain possession of the device throughout the transaction. The device user account information necessary to complete the transaction is retrieved from the device using contactless means. In addition, the transaction device may further include a traditional magnetic stripe so that the transaction device can alternatively be fed through a magnetic stripe reader or inserted in a device acceptance device for transaction completion.

The present invention may be described herein in terms of functional block components, screen shots, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more mircroprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or transacting business, such as the internet, an intranet, an extranet, WAN, LAN, satellite communications, and/or the like. It is noted that the network may be implemented as other types of networks, such as an interactive television network (ITN).

Further still, the terms "Internet" or "network" may refer to the Internet, any replacement, competitor or successor to the Internet, or any public or private inter-network, intranet or extranet that is based upon open or proprietary protocols. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); LOSHIN, TCP/IP CLEARLY EXPLAINED (1997). All of these texts are hereby incorporated by reference.

By communicating, a signal may travel to/from one component to another. The components may be directly connected to each other or may be connected through one or more other devices or components. The various coupling components for the devices can include but are not limited to the Internet, a wireless network, a conventional wire cable, an optical cable or connection through air, water, or any other medium that conducts signals, and any other coupling device or medium.

Where required, the system user may interact with the system via any input device such as, a keypad, keyboard, mouse, kiosk, personal digital assistant, handheld computer (e.g., Palm Pilot™, Blueberry™, cellular phone and/or the like. Similarly, the invention could be used in conjunction with any type of personal computer, network computer, work station, minicomputer, mainframe, or the like running any operating system such as any version of Windows, Windows NT, Windows 2000, Windows 98, Windows 95, MacOS, OS/2, BeOS, Linux, UNIX, Solaris or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates the use, sale, or distribution of any goods, services or information over any network having, similar functionality described herein.

A variety of conventional communications media and protocols may be used for data links providing physical connections between the various system components. For example, the data links may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system including a merchant Point of Sale (POS) device and host network may reside on a local area network which interfaces to a remote network for remote authorization of an intended transaction.

A transaction device identifier, as used herein, may include any identifier for a transaction device which may be correlated to a user transaction account (e.g., credit, charge debit, checking, savings, reward, loyalty, or the like) maintained by a transaction account provider (e.g., payment authorization center). A typical transaction account identifier (e.g., account number) may be correlated to a credit or debit account, loyalty account, or rewards account maintained and serviced by such entities as American Express, Visa and/or MasterCard or the like.

FIG. 1 illustrates an exemplary Radio Frequency (RF) transaction device system 100 for use with the present invention, wherein exemplary components for use in completing a contactless transaction are depicted. In general, the operation of system 100 may begin when a contactless transaction device 102 is presented for payment. An RFID reader 104 provides an interrogation signal for powering the device 102. The interrogating signal may power the contactless transaction device 102 thereby initiating operation of the device 102. The contactless transaction device 102 may provide a transponder identifier and/or account identifier to the RFID reader 104 which may further provide the identifier to the merchant system 130 POS device 110 for transaction completion. Details for the operation of an exemplary RFID transparent system for transaction completion is found in U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," and its progeny which is hereby incorporated by reference.

The RFID reader 104 may be configured to communicate using a RFID internal antenna 106. Alternatively, RFID reader 104 may include an external antenna 108 where the external antenna 108 may be made remote to the RFID reader 104 using a suitable cable and/or data link. RFID reader 104 may be further in communication with a transaction completion system (e.g., merchant system 130) via a data link. In one exemplary embodiment the transaction completion system may include POS device 110 in communication with a RFID reader 104 (via a data link), and a customer interface 118 in communication with the POS device 110.

Although the point of interaction device is described herein with respect to a merchant point of sale (POS) device, the invention is not to be so limited. Indeed, a merchant POS device is used herein by way of example, and the point of interaction device may be any device capable of receiving device account data. In this regard, the POS may be any point of interaction device or transaction device acceptance device enabling the user to complete a transaction using an RF responsive transponder.

A variety of conventional communications media and protocols may be used for the data links. For example, data links may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system 130 including the POS device 110 and host network 112 may reside on a local area network which interfaces to a remote network (not shown) for remote authorization of an intended transaction. The merchant system 130 may communicate with the remote network via a leased line, such as a T1, D3 line, or the like. Such communications lines are described in a variety of texts, such as, "Understanding Data Communications," by Gilbert Held, which is incorporated herein by reference.

Figure 5:
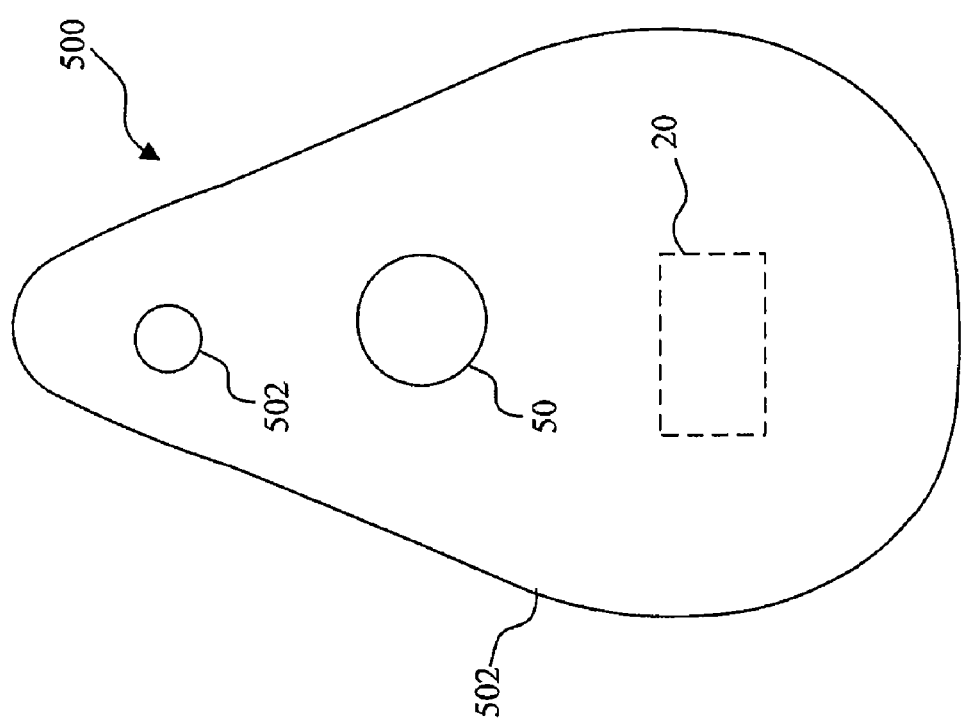
FIG. 5 depicts the front surface of an exemplary RFID transaction device in accordance with an exemplary embodiment of the present invention.

In general, the transaction devices which use the above RF transmission process may take any form. The RFID circuitry may be included in RFID transaction device shaped as desired. To facilitate understanding of this invention, FIG. 5 illustrates a RFID transaction device as teardrop shaped fob 500, although other shapes are contemplated. FIG. 5 shows an exemplary teardrop shaped RFID fob 500, including RFID circuitry 20 for conducting a RF transaction.

The RFID fob 500 may come in many different shapes. Because a typical card manufacturer may provide both transaction cards and RFID fobs, the manufacturer must have proper machinery for cutting sheets of transaction devices into the appropriate device size. The present invention provides a system and method for forming RFID transaction devices, which utilizes conventional dimensional standards for transaction cards (e.g., credit cards, smart cards, etc.) irrespective of the shape of the RFID fob. The invention allows for a manufacturer to use a coextensive transaction card and RFID transaction device manufacturing processes to produce both transaction instruments. The process is termed coextensive since identical material layers and/or circuitry may be used whether the card manufacture desires to cut transaction cards or RFID transaction devices.

Figure 2:
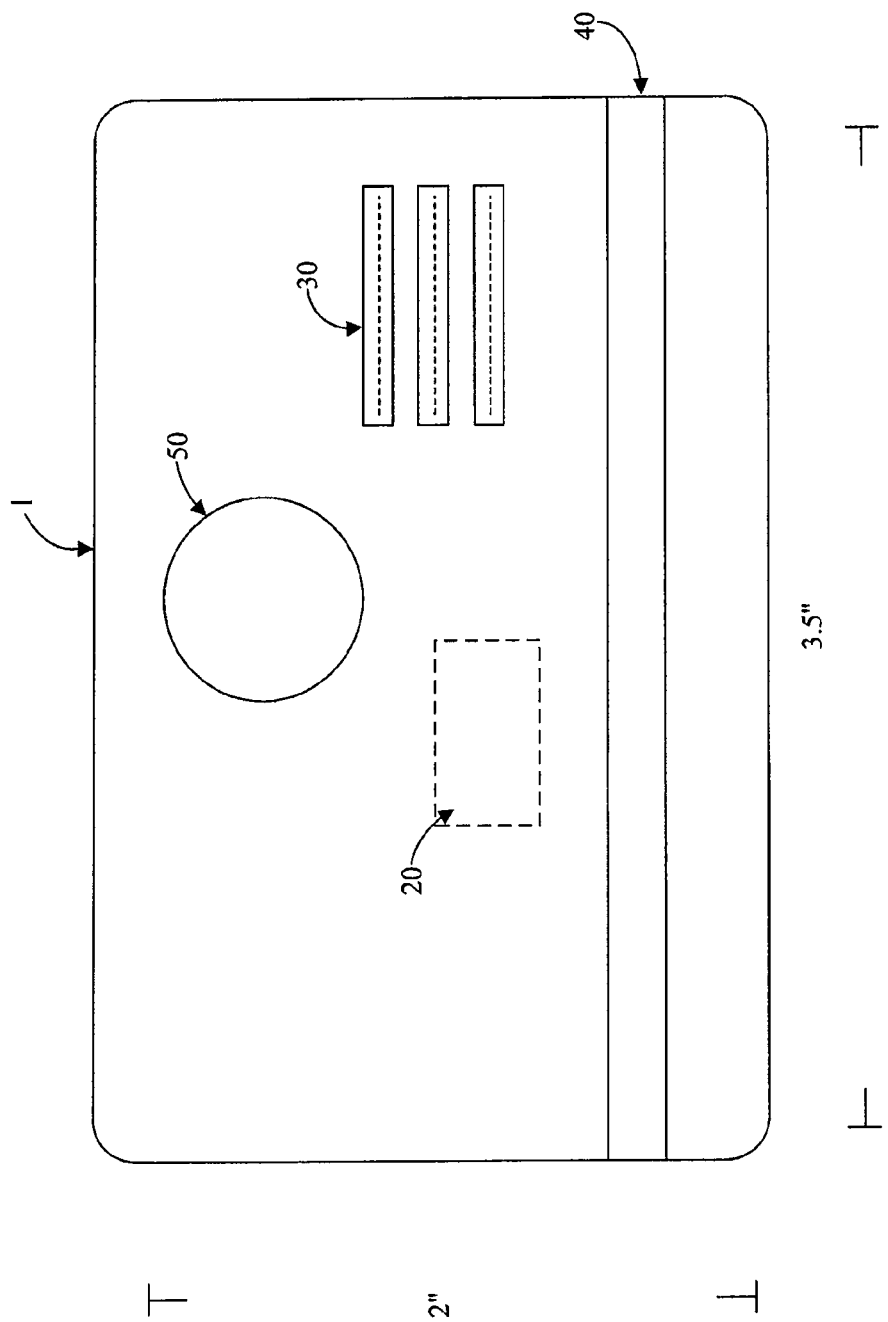
FIG. 2 illustrates an exemplary prior art transaction card in accordance with an exemplary embodiment of the present invention.

FIG. 2 depicts the dimensional relationship of an exemplary transaction card 1. Transaction card 1 is shown with dimensional characteristics which conform to the ISO card size standard. Typically, transaction card 1 is about 2".times.3.5".

Figure 3:
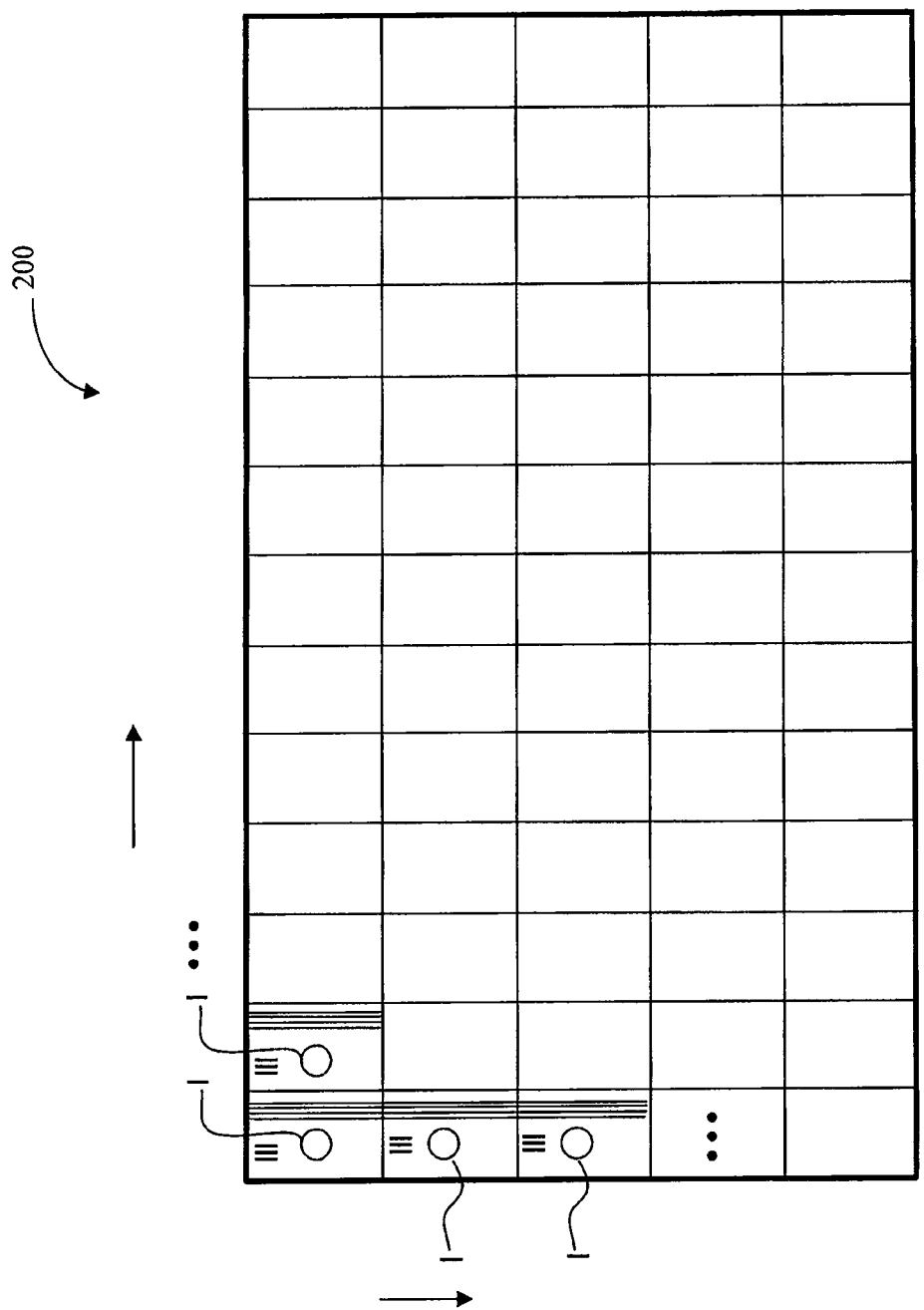
FIG. 3 illustrates an exemplary sheet of plurality of transaction cards in accordance with an exemplary embodiment of the present invention.

Manufacturers of transaction cards take advantage of mass production techniques when manufacturing transaction cards. Instead of producing the cards individually, the cards are produced en masse in sheets 200 which are then cut into the appropriate individual size. FIG. 3 is a depiction of an exemplary sheet 200 of a plurality of transaction cards 1.

Sheet 200 may be prepared using any conventional method of manufacturing a sheet of multiple RF transaction devices 1. The following description is an exemplary method of manufacturing sheet 200. The description is offered to facilitate a understanding of the invention and not by way of limitation.

Figure 4:
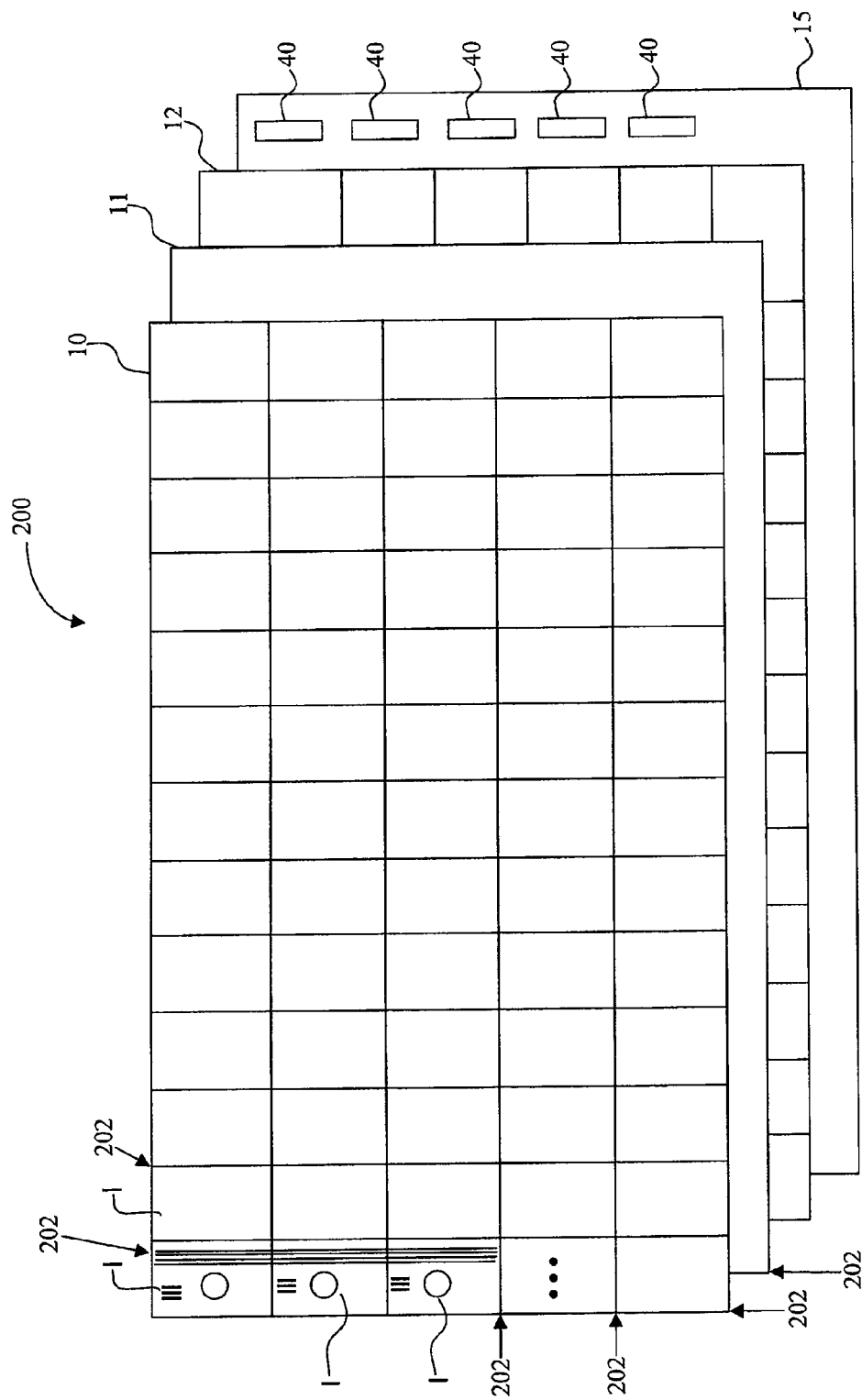
FIG. 4 illustrates an exploded view of an exemplary sheet of a plurality of transaction cards in accordance with an exemplary embodiment of the present invention.

In the exemplary embodiment shown, sheet 200 may be formed using multiple material layers. FIG. 4 illustrates an exploded view of an exemplary sheet 200, which may be used with the present invention. Sheet 200 includes a front material layer 10 and back material layer 12 consisting of a plastic substrate such as, for example, clear core PVC. One skilled in the art will appreciate that layers 10 and 12 of card 1 may be any suitable transparent, translucent and/or opaque material such as, for example, plastic, glass, acrylic and/or any combination thereof. Each material layer 10, 12 is substantially identical and is preferably about 3'.times.4' (622 mm.times.548 mm) and about 0.005-0.350 inches, or more preferably 0.01-0.15 inches or 13.5 mil thick.

The fabrication of the individual card sheets 200 may include either direct layout (9 layers) of film or the use of a sub-assembly (5 layers). An exemplary sub-assembly 11 consists of 5 layers of film with room temperature tack adhesive applied over thermoset and thermoplastic adhesives. The resulting cards comprise (from the card front towards the card back) 2.0 mil outer laminate (PVC, polyvinylchloride) including having a holographic foil, embossed surface, chip and other indicia on its surface, 9.0 mil printed PVC core with print side out (card front), 2.0 mil PVC adhesive, 1.7 mil PET GS (extrusion coated polyethyleneterephthalate-gluable/stampable) manufactured by D&K (525 Crossen, Elk Grove Village, Ill. 60007), 2.0 mil PET IR blocking film, 1.7 mil PET GS, 2.0 mil PET adhesive, 9.0 mil printed PVC core with the print side out (card back), and 2.0 mil outer back laminate with a signature panel, applied magnetic stripe and other indicia. Optimally, the PET IR blocking film is fabricated in the middle of the layers to balance the card and minimize warping of the resulting card product.

After eventually combining the sheets, by preferably adhering the front layer 10 on top of the back sheet 12, the total thickness of the transaction card 1, including the RFID circuitry 20, is about 0.032 in. (32 mil.), which is within the ISO thickness standard for smart cards. Because the RFID circuitry 20 is eventually embedded into the surface of the substrate, the circuitry 20 does not affect the thickness of the overall card 1. Moreover, the about 3'.times.4' sheets include predefined alignment markings which define the boundaries of the individual cards 1 to be cut from the sheet. Each exemplary sheet yields over 50 transaction cards (typically 56 cards), wherein each card 1 is within the ISO card size standard, namely about 2".times.3.5".

In an exemplary embodiment, certain compounds are printed over the surface of sheets 10 and 12. One skilled in the art will appreciate that the printing of the text 30 and logo 50, and optically recognizable ink may be applied to any surface of card 1 such as, for example, the front 10 face (front material layer 10), the rear 12 face (rear material layer 12), the inside or outside surface of either face, between the two sheets of base material and/or a combination thereof. Moreover, any suitable printing, scoring, imprinting, marking or like method is within the scope of the present invention.

The text 30 and logo 50 are printed on the outside surface of each material layer 10, 12 by a known printing process, such as an offset printing process, which provides a thinner ink coverage, but clearer text. More particularly, with respect to offset printing, the artwork is duplicated onto a metal plate and the metal plate is placed onto an offset press printing machine which can print up to four colors during a single run. The offset printed text may includes, for example, a corporate name, a copyright/trademark/patent notice, a batch code number, an "active thru" date, contact telephone numbers, legal statements and/or the like. The exemplary offset text may be printed in 4DBC in opaque white ink or a special mix of Pantone Cool Gray 11 called UV AMX Gray.

A laminate material layer 15 is applied to the back layer 12 of card 1. In one preferred embodiment, the laminate layer 15 includes rows of magnetic stripes 40, wherein each magnetic stripe 40 corresponds to an individual card 1. The magnetic stripe 40 may extend along one length of the card 1 and is applied to the back surface 12. The magnetic stripe 40 may be any width, length, shape, and placed on any location on card 1. In an exemplary embodiment, the magnetic stripe 40 is applied to the outer laminate layer 15 using a tape layer machine which bonds the cold peel magnetic stripe 40 to the outer laminate 15 when it is in a rolled position (not shown). The laminate 15 roll with a rolling hot die and at suitable pressure. The roll is then cut into layers 10, 12 before the card layers are assembled.

After the desired printing is complete and the magnetic stripe applied, the front 10 and back 12 material layers are placed together, and the layers are preferably adhered together by any suitable adhering process, such as a suitable adhesive. One skilled in the art will appreciate that, instead of printing on two material layers and combining the two material layers, a single plastic material layer can be used, wherein the single material layer is printed on one side, then the same material layer is re-sent through the printer for printing on the opposite side.

In the present invention, after adhering the layers together, a layer of lamination (not shown), approximately the same dimensions as the plastic sheets, namely 3'.times.4', is applied over the front 10 and back 12 of card 1. After the laminate is applied over the front 10 and back 12 of the combined plastic material layers, card 1 layers are suitably compressed at a suitable pressure and heated at about 300 degrees, at a pressure of between 90-700 psi, with a suitable dwell time to create a single card 1 device. The aforementioned card fabrication can be completed by, for example, Oberthur Card Systems, 15 James Hance Court, Exton, Pa.

In an exemplary embodiment, the card layers 10 and 12 are fused together in a lamination process using heat and pressure. During the hot press phase, the press is heated to about 300 F. degrees and the pressure builds to about 1000 psi and holds for about 90 seconds. The pressure then ramps up to about 350 psi over an about 30 second period and holds for 16 minutes at the same temperature, namely 300 F. degrees. The sheet 200 is then transferred to a cold press which is at about 57 F. degrees. The pressure builds to about 400 psi and is held for about 16 minutes as chilled water of about 57 F. degrees is circulated in the plates. The cold press then unloads the sheet 200.

In one exemplary manufacturing embodiment, the cards 1 may include internal circuitry for use in completing contactless transactions. For example, card 1 may include a RFID circuitry 20 included in the card body. The RFID circuitry 20 is preferably positioned substantially central to the card body. The RFID circuitry 20 may be included interposed between front surface material layer 10 and back surface material layer 20 during fabrication of the sheet 200. Alternatively, after lamination, the RFID circuitry 20 may be included within an individual card 1 within a space created by milling the card body and providing room for the insertion of the RFID Circuitry 20. As such, upon including the RFID circuitry, sheet 200 will comprise a plurality of RFID operable transaction cards 1. Traditional methods for including RFID circuitry 20 in transaction devices 1 are well known, and are intended to be within the scope of the invention.

After the card sheet 200 is laminated and the RFID circuitry 20 added, the sheets may be cut into individual cards 1 by a known stamping process, including any necessary curing, burrowing, heating, cleaning and/or sealing of the edges. The individual transaction cards 1 are about 2".times.3.5" and conform to ISO standards for transaction card 1 shape and size.

In an exemplary embodiment, the laminated sheets 200 of 56 transaction cards 1 are suitably cut in half on a gilloutine device, resulting in two half-sheets of 28 cards. The half-sheets are loaded onto a card punch machine which aligns the sheets to a die (x and y axes) using predetermined alignment marks 202 visible to the optics of the machine. The half-sheets are then fed under a punch to punch out the desired transaction card 1 in seven steps. Particularly, a fixed distance feed is followed by another optic sensor search to stop the feed at the preprinted alignment mark, then the machine punches a row of four cards 1 out at one time, each punch being made along a preprinted alignment mark 202.

The preprinted alignment marks 202 indicate the perimeter boundaries of each card 1 to be cut from sheet 200. In general, the preprinted alignment marks 202 are included in the sheet 200 as the writing is being added to the device material layers 10, 12. A typical sheet 200 may yield over 50 transaction cards (typically 56). In general, the shape of the cards 1 is kept consistent by using a cutting apparatus having a preformed cutting dye formed in the desired shape. For example, the cutting dye may be formed in any shape, such as for example, a traditional credit card shape as shown in FIG. 1. Alternatively, the shape is cut by using, for example, a laser or other cutting apparatus guided by the preprinted alignment marks 202.

To separate each transaction card 1 from the other, the cuts may typically be made along the preprinted alignment marks 202. The resulting individual transaction cards 1 may then be distributed for immediate activation and use.

Conventional methods of fabricating, manufacturing and cutting transaction devices, such as, credit cards, smart cards, RFID key fobs are well known. As such, one skilled in the art will understand the machinery and processes for fabricating, manufacturing, and/or cutting as they are included in the scope of this invention. Indeed, in the interest of brevity, conventional methods of fabricating, manufacturing and cutting transaction devices will not be discussed in detail herein. For instruction on manufacturing and fabricating a typical transaction card, see U.S. patent application Ser. No. 10/092,681, entitled "TRANSACTION CARD," filed Mar. 7, 2002, and incorporated herein in its entirety.

While the foregoing describes an exemplary embodiment for the fabrication of transaction device 1, one skilled in the art will appreciate that any suitable method for incorporating text 30, logos 50, a magnetic stripe 40, a signature field, holographic foil 15, an RFID circuitry 20 onto a substrate is within the scope of the present invention. Particularly, the holographic foil, RFID circuitry 20, logo 50, magnetic stripe 40, signature field or any other compound may be affixed to any portion of device 1 by any suitable means such as, for example, heat, pressure, adhesive, grooved and/or any combination thereof.

Figure 6:
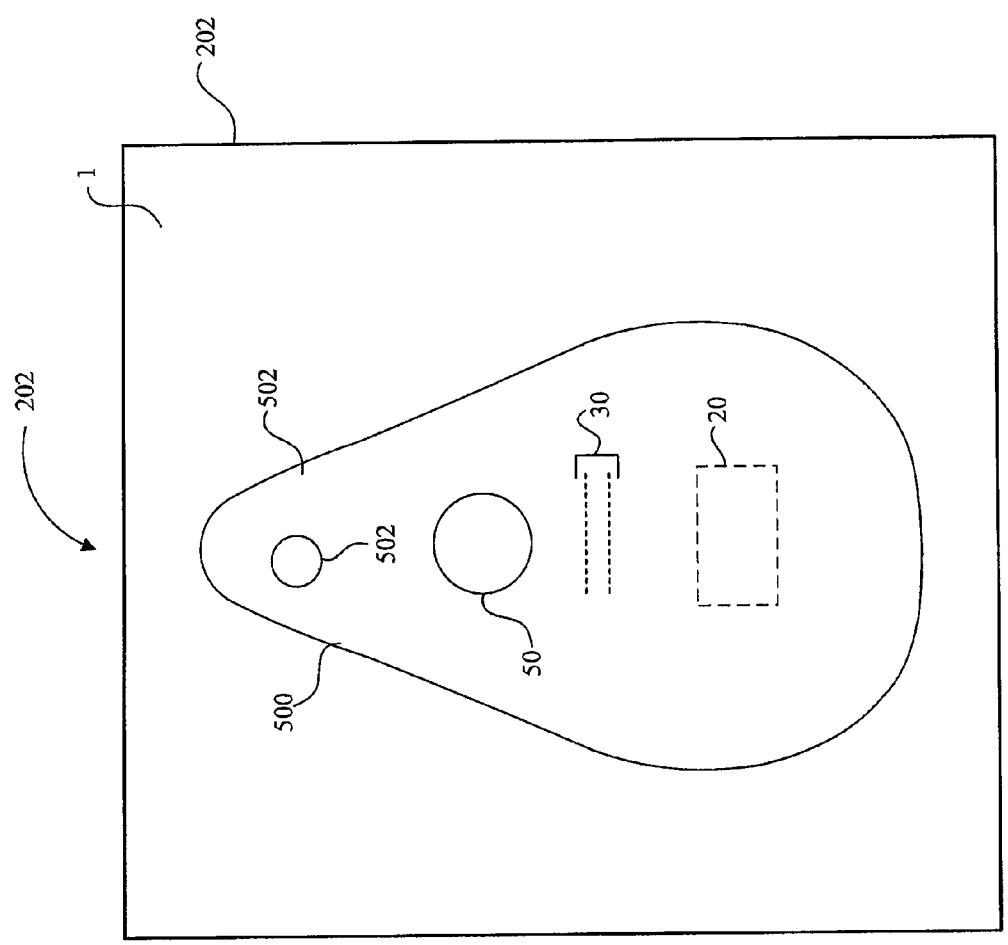
FIG. 6 depicts the front surface of an exemplary RFID transaction card including a RFID transaction device in accordance with an exemplary embodiment of the present invention.

As noted, various card manufacturers are producing RFID transaction devices that are irregularly shaped. As such, the irregular shaped transaction devices are typically cut using a cutting dye, or other method discussed above, which is designed to cut a sheet 200 into the desired transaction device shape. With reference to FIG. 5, the teardrop shaped RFID transaction device (key fob) 500 is shown. To provide transaction devices of similar shape as device 500, a card manufacturer may typically use a cutting machine including a teardrop shaped cutting dye, or a cutting means guided by the preprinted device 500 alignment marks 502 (shown in FIG. 6). As can be seen, the RFID transaction device 500 may include a logo 40.

Figure 7:
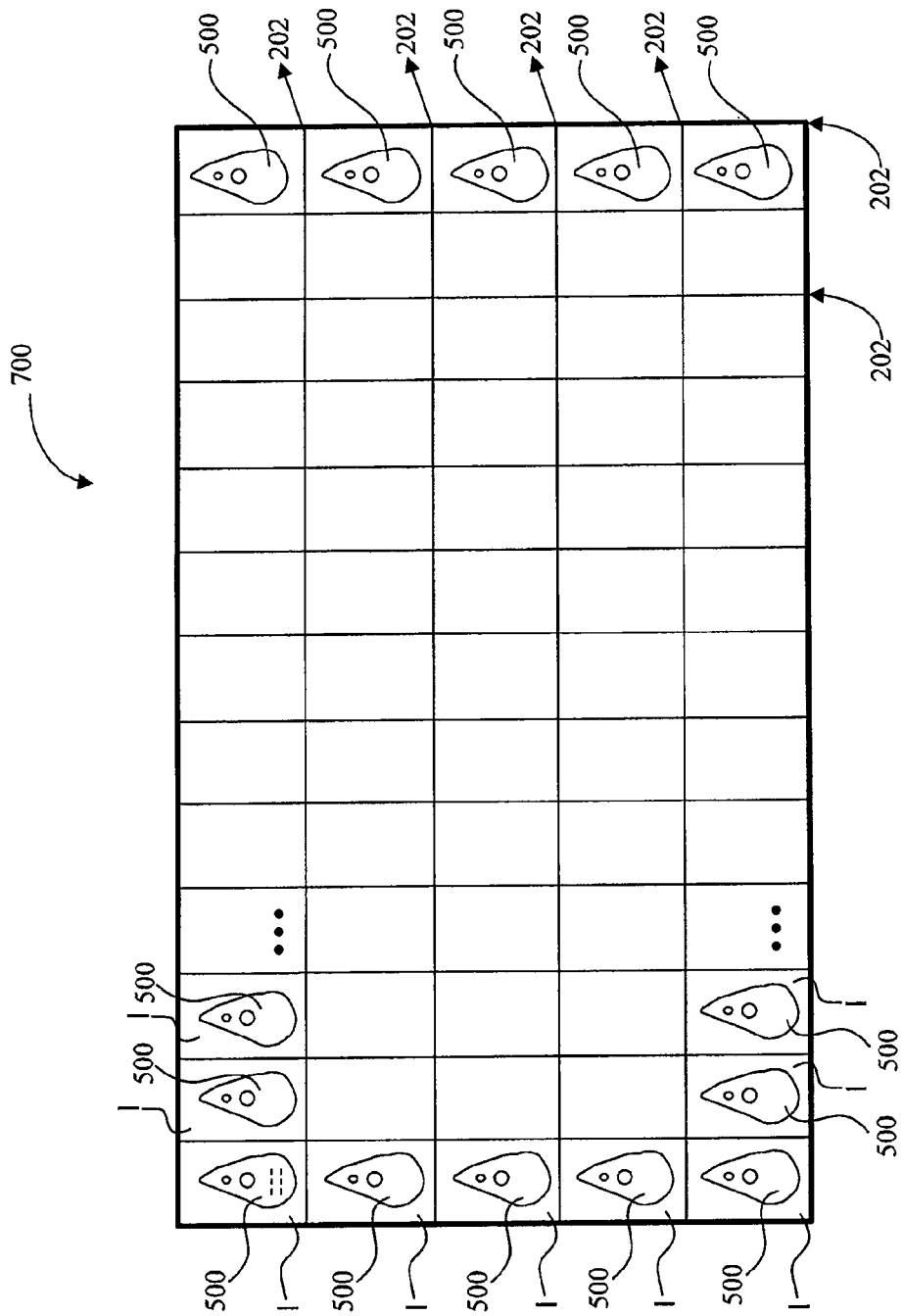
FIG. 7 shows an exemplary sheet of a plurality of RFID transaction cards each including a transaction device, therein, in accordance with an exemplary embodiment of the present invention.
Figure 8:
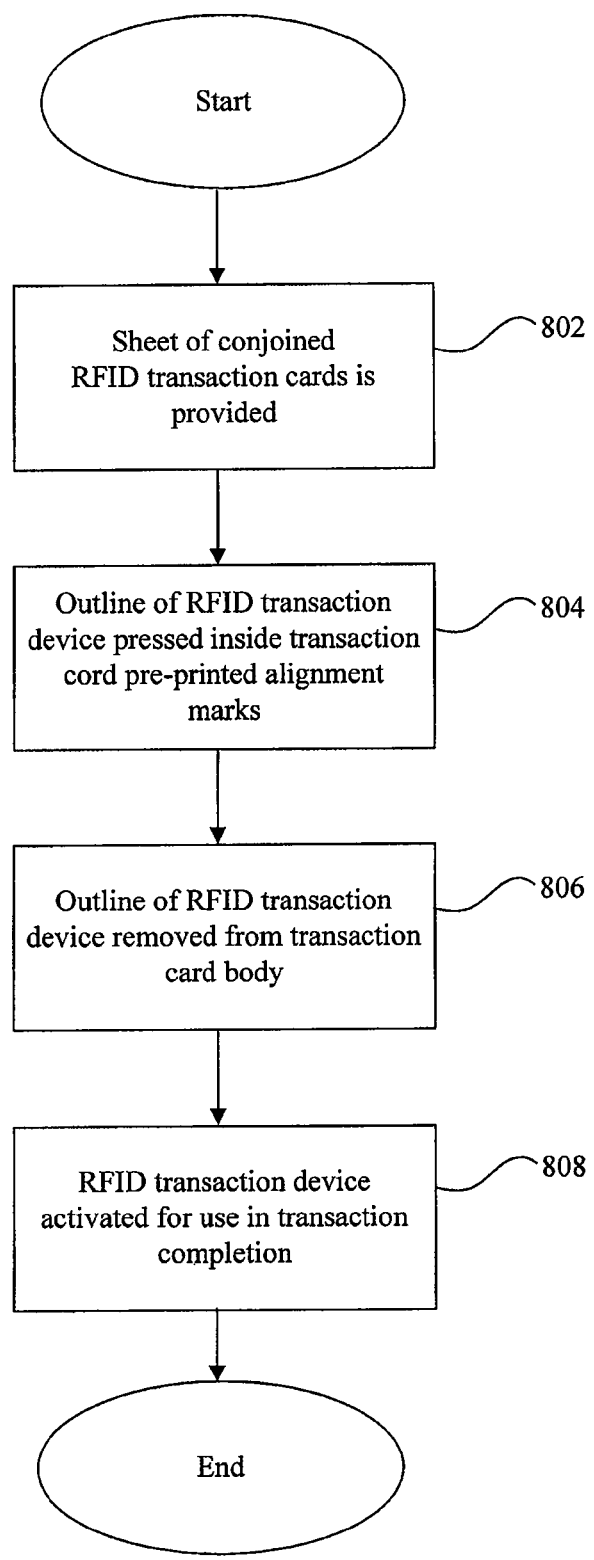
FIG. 8 is an exemplary flowchart of the overview of the RFID transaction device manufacturing method in accordance with an exemplary embodiment of the present invention.

In accordance with one aspect of the invention, a credit card manufacturer may provide an irregularly shaped RFID transaction device 500 using a manufacturing process that is coextensive with the manufacturing process used for traditional transaction card 1 shapes. FIG. 8 depicts an exemplary overview of the method according to the invention. As shown in FIG. 7, a material transaction device sheet 700 including a plurality of conjoined RFID transaction cards 1 is provided, wherein the transaction cards 1 include transaction devices 500 impressed within the preprinted alignment marks 202. The sheet 700 may be prepared using conventional RFID transaction device and transaction card fabricating methods (step 802). The outline of the irregular shaped removable RFID transaction device 500 design, shown as preprinted alignment marks 502 in FIG. 6, may be pressed into, and contained substantially inside, the preprinted alignment marks 202 of a conventional transaction device 1 (step 804). The irregular shaped removable RFID transaction device 500 may then be removed from the (i.e., "punched out" of) preprinted alignment marks 202 (step 806). The resulting RFID transaction device 500 may then be used in completing a RF transaction under any merchant or account provider business as usual standards (step 808).

To assist in punching out the transaction device 500, the RFID transaction device preprinted alignment marks 502 may be pressed into the transaction card 1 body defined by transaction card 1 preprinted alignment marks 202. The transaction card 1 body may be formed with one or more material layers, such as, for example, front layer 10, and back layer 20. The pressing action may result in indentations, or perforations being impressed into or through one or more layers of the multilayer transaction device. The perforations or indentations may not traverse completely through the card body. Instead, the perforations or indentations are impressed at such sufficient depth to permit the transaction device 500 to be removed from the transaction card 1 body with minimal effort. Thus, the perforations or indentations are typically provided along the transaction device 500 preprinted alignment marks 602. Preferably, the perforations and indentations used to form the outline of the transaction device 500 may be arranged to form an outline of a shape, a picture, a security enhancing visage or the like. Suitable methods for providing perforations are disclosed in U.S. patent application Ser. No. 10/288,945, entitled "PERFORATED TRANSACTION CARD," filed Nov. 6, 2002, incorporated herein by reference in its entirety.

Figure 9:
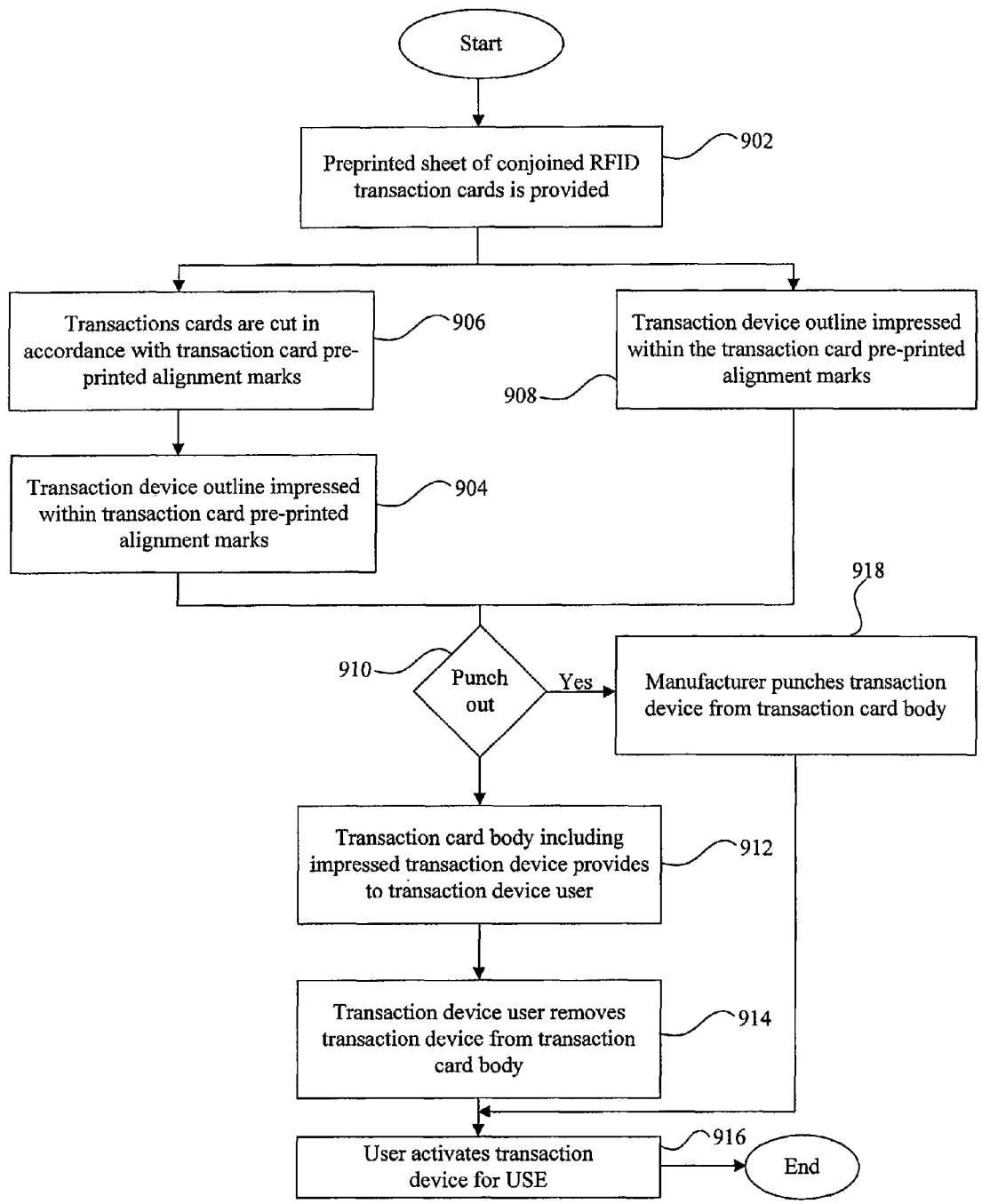
FIG. 9 is a flowchart of the various embodiment of the method of manufacturing a RFID transaction device in accordance with an exemplary embodiment of the present invention.

FIG. 9 illustrates various exemplary embodiments of a method for providing a plurality of RFID transaction devices 500 punched out of a transaction card body 1. In accordance with step 902, each exemplary embodiment begins with the fabrication of a multilayer sheet 700 of a plurality of conjoined RFID transaction cards 1. An impression of a RFID transaction device 500 is preferably included within the preprinted alignment marks 202 of each transaction card 1 body. The impression is typically made such that a RFID transaction device 500 may be removed from, or punched out of, the transaction card 1 body.

In accordance with one exemplary embodiment of the present invention, the transaction device outline is impressed within the card 1 body drawn by alignment marks 202. For example, the preprinted sheet 700 of conjoined RFID transaction cards 1 is provided (step 902) with the transaction card alignment marks 202 preprinted on the card front or rear surface 10, 12, and the transaction device outline 502 ("alignment marks 502") is impressed within the alignment marks 502 (step 904).

Once the impression of the transaction device 500 is made in the transaction card body 1, the transaction device 500 may be prepared to be removed from the transaction card 1 body (step 910). In one exemplary embodiment, the transaction device 500 is removed from the transaction card 1 body by the manufacturer (step 918) prior to providing the transaction device to a user for device activation and device usage (step 916).

In an alternate embodiment of the invention, the RFID transaction device 500 is removed from the transaction card 1 body by the end user. For example, a transaction card provider may provide a customer with the transaction card 1 body including the impressed transaction device 500 outline 502, in combination (step 912). The user may then have the liberty to remove the transaction device 502 from the transaction card 1 body at the customer's leisure (step 914), and to activate the transaction device for use (step 916).

In exemplary operation, a user of the RFID transaction device 500 simply approaches an RF-based reader 104 when the user wishes to conduct a transaction. The user simply waves the RFID transaction device 500 at a certain distance from the RF-based reader 104 until the reader 104 acknowledges that the information contained in the RFID circuitry 20 has been received. The RF-based reader 104 then utilizes at least a portion of the information contained in circuitry 20 (such as, a user's account number associated with the transaction device) to complete the transaction.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the preceding detailed description is presented for purposes of illustration only and not of limitation, and the scope of the invention is defined solely by the appended claims and their legal equivalents when properly read in light of the preceding description. For example, the steps recited in any of the method or process claims may be executed in any order and are not limited to the order presented. In addition, although the present description illustrates the invention as embodied in a card or key fob, the invention is not so limited. That is, the present invention contemplates the incorporation of the inventive technology into a form factor presentable by hand.

The invention claimed is:

1. A method for manufacturing a radio frequency identification (RFID) transaction device, comprising:
sensing a plurality of preprinted RFID transaction device alignment marks on a sheet of the plurality of RFID transaction cards, wherein each RFID transaction card is distinguished from each other RFID transaction card by transaction card alignment marks, the transaction card alignment marks defining the individual outside perimeter for each RFID transaction card;
causing a stamping device to reconfigure to impress a shape defined by the preprinted RFID transaction device alignment marks;
impressing, by the stamping device, a plurality of distinct RFID transaction device outlines into the sheet of the plurality of RFID transaction cards as defined by the preprinted RFID transaction device alignment marks for each respective RFID transaction device;
punching out at least one of the plurality of RFID transaction cards in accordance with the transaction card alignment marks; and
removing the RFID transaction device from within at least one of the plurality of the RFID transaction cards.

2. The method of claim 1, wherein the punching out of the RFID transaction card and the removing of the RFID transaction device are done simultaneously.

3. The method of claim 1, wherein the punching out of the RFID transaction card is completed by a card manufacturer.

4. The method of claim 1, wherein the removing of the RFID transaction device is completed by a transaction device user.

5. The method of claim 1, wherein the transaction card alignment marks are comprised of optically recognizable ink.

6. The method of claim 1, wherein the RFID operable transaction device is removed from the RFID operable transaction card through machine punching.

7. The method of claim 1, wherein the RFID operable transaction card and the RFID operable transaction device share RFID circuitry.

8. The method of claim 1, wherein the RFID circuitry is in communication with a transactions account issuer for completion of a transaction.

9. The method of claim 1, wherein the RFID operable transaction device includes a magnetic stripe for conducting transactions in a contact environment.

10. The method of claim 1, wherein the sensing uses an optic sensor.

11. The method of claim 1, wherein each RFID transaction device outline is impressed so as to lie substantially completely within an RFID transaction card outside perimeter.

12. The method of claim 1, wherein the impressing of the RFID transaction device outlines is accomplished with sufficient pressure so as to form a removable RFID transaction device within each transaction card outside perimeter.

13. The method of claim 1, wherein the RFID transaction device is operable to send radio frequency (RF) transmission.

14. A system for manufacturing a radio frequency identification (RFID) operable transaction device supported within the body of an RFID operable transaction card, the RFID operable transaction device being removable from the RFID operable transaction card for independent operation, the system comprising:
a sheet of a plurality of RFID transaction cards, wherein each RFID transaction card is distinguished from each other RFID transaction card by transaction card alignment marks, the transaction card alignment marks defining the individual outside perimeter for each RFID transaction card;
a sensor operable to sense a plurality of preprinted RFID transaction device alignment marks on the sheet of the plurality of RFID transaction cards;
a stamping device operable to reconfigure to impress a shape defined by the preprinted RFID transaction device alignment marks read by the sensor and to impress a plurality of distinct RFID transaction device outlines into the sheet of the plurality of RFID transaction cards as defined by the preprinted RFID transaction device alignment marks for each respective RFID transaction device;
a punching device operable to punch out at least one of the plurality of RFID transaction cards in accordance with the transaction card alignment marks; and a removing device operable to remove the RFID transaction device from within at least one of the plurality of the RFID transaction cards.

15. The system of claim 14, wherein the RFID operable transaction device is removed from the RFID operable transaction card through machine punching.

16. The system of claim 14, wherein the RFID operable transaction card and the RFID operable transaction device share RFID circuitry.

17. The system of claim 14, wherein the RFID circuitry is in communication with a transactions account issuer for completion of a transaction.

18. The system of claim 14, wherein the RFID operable transaction device includes a magnetic stripe for conducting transactions in a contact environment.

19. The system of claim 14, Wherein the transaction card alignment marks are comprised of optically recognizable ink.

20. The system of claim 14, wherein each RFID transaction device outline is impressed so as to lie substantially completely within an RFID transaction card outside perimeter.

* * * * *